United States Patent [19]
Nelson et al.

[11] Patent Number: 5,168,493
[45] Date of Patent: Dec. 1, 1992

[54] TIME DIVISION MULTIPLEXED SELECTIVE CALL SYSTEM

[75] Inventors: Leonard E. Nelson, Boynton Beach; Robert J. Schwendeman, Pompano Beach; Michael J. DeLuca, Boca Raton; David F. Willard, Popano Beach; Jerry L. A. Sandvos, Davie, all of Fla.; William V. Braun, Elmhurst, Ill.

[73] Assignee: Motorola, Inc., Schaumburg, Ill.

[21] Appl. No.: 793,230

[22] Filed: Nov. 8, 1991

Related U.S. Application Data

[63] Continuation of Ser. No. 459,485, Jan. 2, 1990, abandoned.

[51] Int. Cl.⁵ .......................... H04Q 7/00; H04J 3/22
[52] U.S. Cl. ..................................... 370/84; 370/112; 340/825.44; 455/38.1
[58] Field of Search ...................... 370/79, 80, 81, 84, 370/95.1, 95.3, 104.1, 112, 118; 340/825.44, 825.47, 825, 48, 825, 52; 455/38, 343

[56] References Cited

U.S. PATENT DOCUMENTS

| | | | |
|---|---|---|---|
| 4,506,262 | 3/1985 | Vance et al. | 340/825.44 |
| 4,518,961 | 5/1985 | Davis et al. | 340/825.44 |
| 4,642,632 | 2/1987 | Ohyagi et al. | 455/38 |
| 4,649,538 | 3/1987 | DeLuca et al. | 371/24 |
| 4,745,408 | 5/1988 | Nagata et al. | 455/343 |
| 4,755,816 | 7/1988 | DeLuca | 340/825.44 |
| 4,816,820 | 3/1989 | Davis | 340/825.44 |
| 4,882,726 | 11/1989 | Lang et al. | 370/84 |
| 4,918,437 | 4/1990 | Jasinski et al. | 340/825.44 |
| 4,949,339 | 8/1990 | Shimada et al. | 370/112 |
| 4,953,180 | 8/1990 | Fieschi et al. | 370/84 |
| 5,001,471 | 3/1991 | Snowden et al. | 455/343 |

FOREIGN PATENT DOCUMENTS

0264205A2 4/1988 European Pat. Off. .
8601357 2/1986 World Int. Prop. O. ............ 370/84

Primary Examiner—Douglas W. Olms
Assistant Examiner—Alpus H. Hsu
Attorney, Agent, or Firm—Daniel R. Collopy; William E. Koch; Thomas G. Berry

[57] ABSTRACT

A signalling protocol comprising a plurality of interleaved phases is transmitted at various baud rates, the various baud rates being multiples of a base baud rate. The signalling protocol allows a selective call receiver to decode at an operating baud rate equivalent to the base baud rate irrespective of the transmission baud rate by decoding only a portion of the transmitted signal, the portion decoded determined by the baud rate and the address of the selective call receiver.

22 Claims, 23 Drawing Sheets

TIME DIVISION MULTIPLEXED SELECTIVE CALL SYSTEM

This is a continuation of application Ser. No. 07/459,485, filed Jan. 2, 1990, now abandoned.

FIELD OF THE INVENTION

This invention relates in general to a selective call system, and in particular to a signalling protocol for use with a selective call system having a transmitter and a plurality of selective call receivers, the selective call system providing transmissions at several different bit rates.

BACKGROUND OF THE INVENTION

With the increase in the popularity of selective call messaging, channel capacity for selective call systems has become a scarce commodity in major metropolitan areas. This popularity has resulted in long delays between the input of selective call messages to a selective call terminal and the transmission of the selective call messages from the terminal. As new selective call services are introduced on existing channels, the overcrowding of existing selective call channels is expected to increase. One solution to this problem is to increase the number of channels allocated to selective call messaging. This solution can only be implemented by the government regulating authorities who are already overburdened with requests for more RF channel allocations from other types of services, for example, land mobile and cellular telephone. Even if new channels are made available by the government, there is no guarantee that a particularly busy selective call system provider will be able to obtain a license on the new channel.

Another solution to the overcrowding is to increase the amount of traffic that can be handled on the existing channels by increasing the baud rate (i.e. the number of bits transmitted per second (bps)) of the transmitted signal. This solution has been implemented in the United Kingdom where the bit rate for a selective call signalling protocol identified as Radio Paging Code No. 1 of the Post Office Code Standardisation Advisory Group (POCSAG) has been increased from 512 bps to 1200 bps. Unfortunately, simply introducing new 1200 baud selective call receivers onto an existing selective call system's channel does not substantially increase channel capacity unless the older 512 baud units are retired from service and replaced with 1200 baud pagers. In addition, merely increasing the baud rate, without modifying the code format, has a number of undesirable effects. For example, for each doubling of the bit rate, the paging sensitivity in the Gaussian environment degrades by two to three decibels (dB). Also, increasing the bit rate generally requires the decoder in the selective call receiver to run faster resulting in a decrease in battery life. Finally, for each doubling of the bit rate in a Rayleigh fading environment, the maximum fade length that can be tolerated is reduced by one half which may result in the loss of six dB or more of paging sensitivity in the fading environment. This loss of sensitivity in the fading environment is caused by an increase in the number of erroneous bits received by the selective call receiver due to the fact that the burst errors at the higher baud rate affect more bits. Most signalling protocols have error correction algorithms which can reconstruct the information transmitted as long as the number of erroneous bits received is below a predetermined number. When the erroneous bits received increases above the predetermined number allowed, the information received cannot be reliably reconstructed.

The loss in Gaussian noise sensitivity is a cost of increasing the bit rate. The loss in fade protection, however, can be overcome through the use of bit interleaving. For instance, in the Golay Sequential Code (GSC), an alternate selective call signalling protocol to POCSAG, the message information consists of eight (15,7) BCH code words interleaved to a depth of eight and transmitted at 600 baud. This provides sixteen bits of burst error protection which is equivalent to 27 msec of fade protection. To provide the same amount of fade protection at 1200 baud requires the interleaving depth to be increased to sixteen. However, increasing the interleave depth generally complicates the selective call receiver decoder since more memory (RAM) is required for the deinterleaver. Furthermore, if an attempt is made to make the decoder adaptive to a variety of bit rates while maintaining a constant amount of fade protection, the deinterleaver must be reconfigured with each change in the bit rate.

One implementation of signal interleaving at different transmission speeds is disclosed in European Patent Application 88-106961/16, published as European Patent Office Patent Publication No. 264-205-A (EPA '205). The system disclosed in EPA '205 accommodates receivers of different bit rates without reconfiguring the deinterleaver with each change in the bit rate and is resistive to burst errors even if the bit rate is increased. The EPA '205 system, though, requires the selective call receiver decoder to run at higher operating speeds for higher baud rates resulting in reduced battery efficiency and shorter battery life for the selective call receiver's battery.

Thus, what is needed is a method and apparatus for interleaving and deinterleaving a signal in a selective call system environment at successively deeper interleaving depths with successively higher transmission baud rates wherein the battery life in the selective call receivers is not decreased due to the higher baud rate of transmission and the loss in paging sensitivity is minimized and the maximum tolerable fade length are not decreased.

SUMMRY OF THE INVENTION

Accordingly, it is an object of the present invention to provide a variable bit rate selective call system in which the interleave depth is varied in proportion to the baud rate so as to maintain a constant amount of fade protection.

It is a further object of the present invention to provide a selective call receiver decoder which operates at essentially the same speed and requires essentially the same amount of memory and other resources at the high baud rate as the selective call receiver does at the lower baud rate.

It is also an object of the present invention to enable the selective call receiver decoder to operate at a minimum speed defined by the lowest baud rate thereby providing for battery power efficiency resulting in long battery life.

In carrying out the above and other objects of the invention in one form, there is provided a method for generating a signal for transmission in a selective call system by time division multiplexing selective call messages, each message having a selective call address, where the time division multiplexing operation is varied in response to the selected baud rate.

DETAILED DESCRIPTION OF THE INVENTION

Figure 1A:
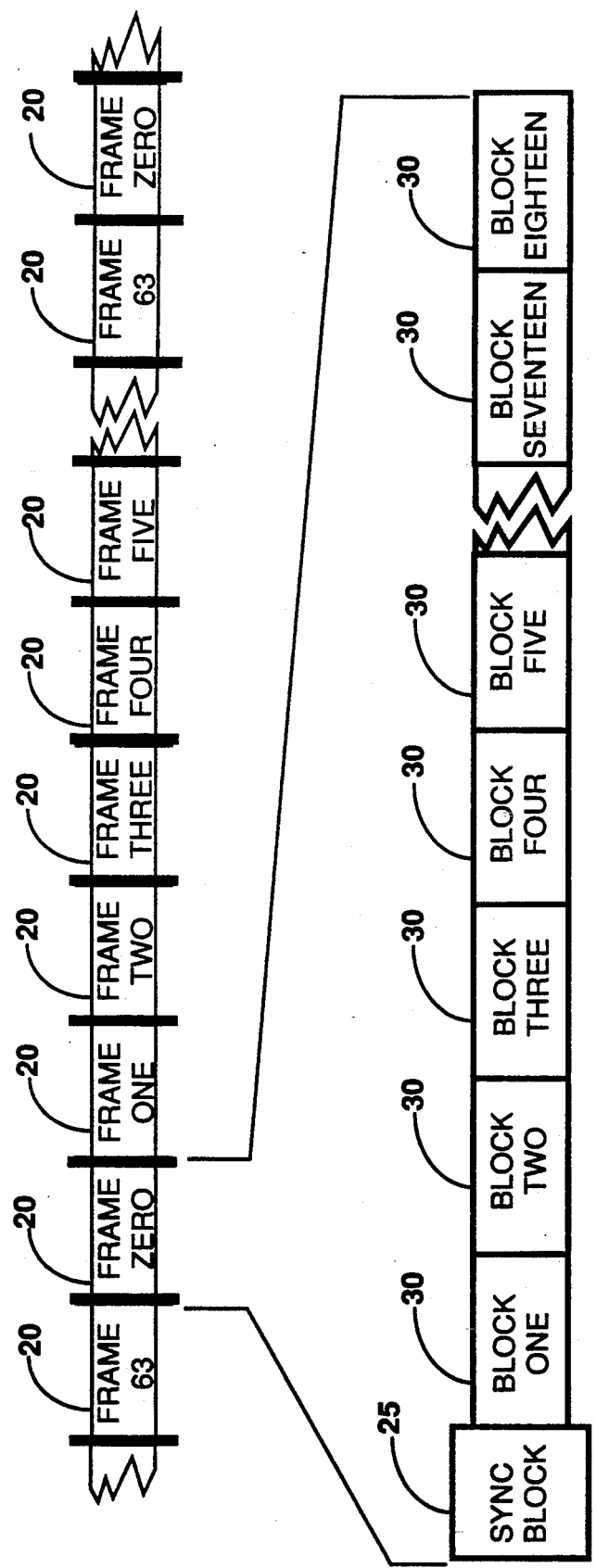
FIGS. 1A, 1B and 1C are representations of the signalling protocol utilized in the preferred embodiment of the present invention.
Figure 1B:
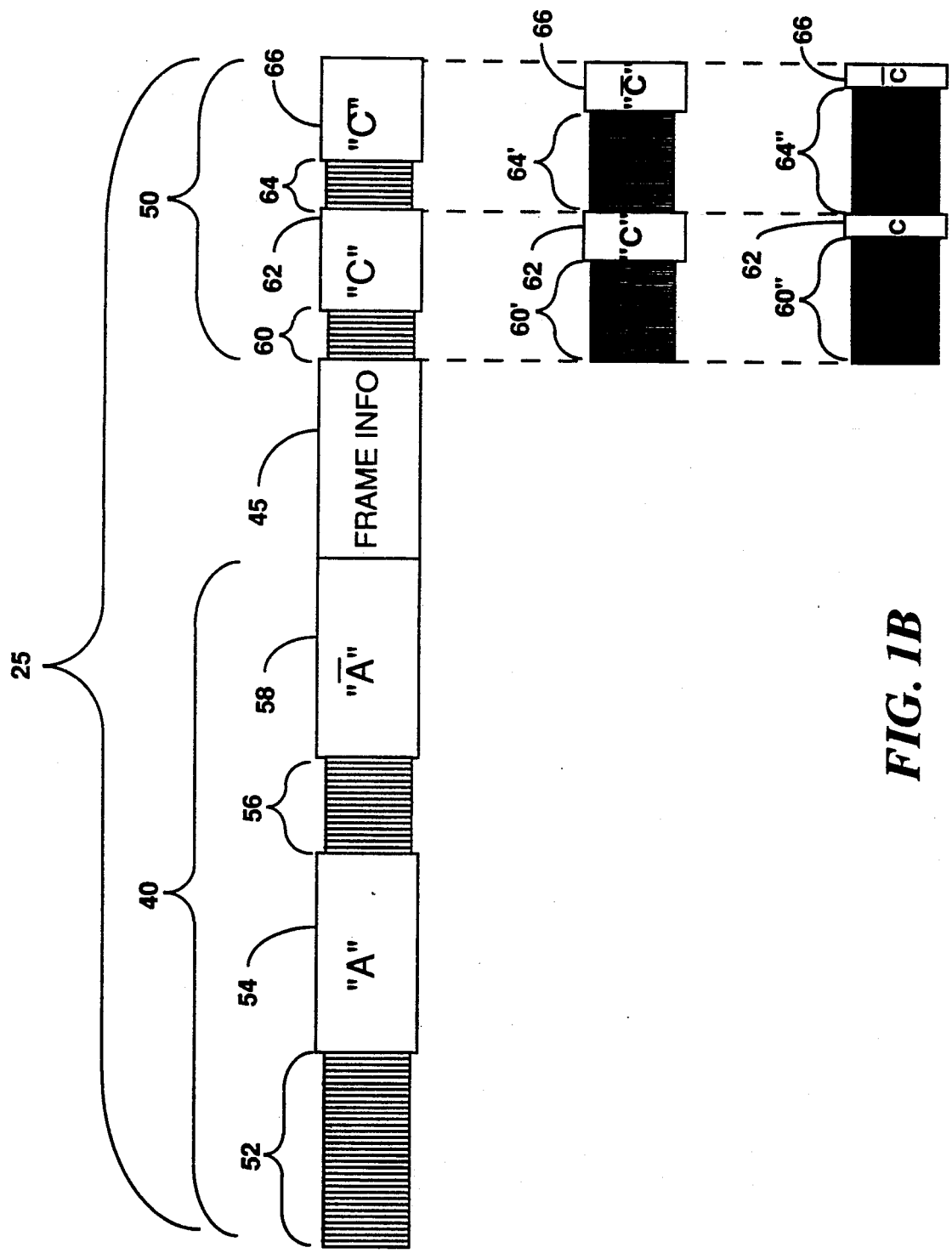
Figure 1C:
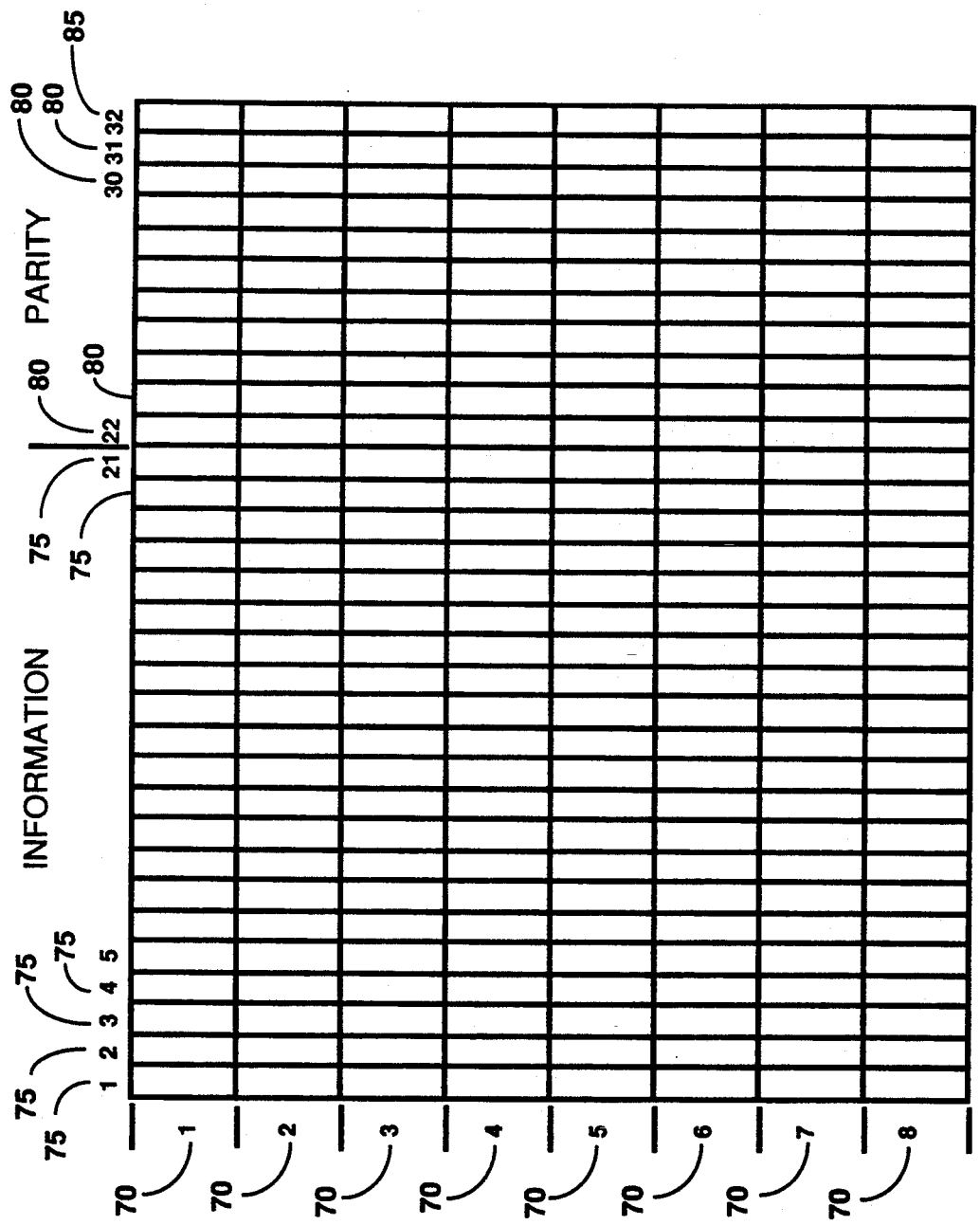

Referring to FIGS. 1A, 1B and 1C, the signalling protocol of the preferred embodiment comprises a system of sixty-four rotating frames 20. Each frame 20 in turn comprises a synchronization (sync) block 25 and eighteen information blocks 30. The time for the system to cycle, i.e. for the sixty-four frames 20 to be transmitted, is 256 seconds with four seconds for each frame 20. The information blocks 30 contain addresses and data and, in some cases, system overhead information.

Referring to FIG. 1B, the sync block 25 of each frame is sent at a predetermined baud rate and conveys the baud rate information necessary to decode the eighteen information blocks. The sync block 25 also comprises synchronization information to allow the selective call receiver to locate the start of the transmission of the first information block 30 of a frame 20. In the preferred embodiment, the sync block 25 comprises a coarse bit and frame sync portion 40, a frame information portion 45, and a fine bit and frame sync portion 50. The sync block is equivalent in time to 192 bits sent at the 1200 baud base baud rate in the preferred embodiment, for a total of 160 milliseconds (msec) transmission time. The frame information portion 45 comprises a (32,21) BCH word which identifies and supplies frame information and other information on the particular frame 20 (FIG. 1A) in which the sync block 25 appears. The second bit synchronization portion 50 is used for acquiring synchronization to the information block baud rate. Portion 40 is utilized to acquire bit and frame synchronization to the signalling protocol base baud rate, which in the preferred embodiment is 1200 baud. A thirty-two bit pattern 52 of alternating ones and zeros is utilized for acquiring bit synchronization and a (32,21) BCH word "A" 54 is utilized for frame synchronization and in addition conveys the baud rate at which the information blocks are transmitted. An additional sixteen bit one/zero pattern 56 aids bit synchronization and a (32,21) BCH word "inverted A" 58 is used for redundancy to provide a second opportunity for frame synchronization and for determining the baud rate information. In the preferred embodiment, the "A" words can be one of six words indicating at which of the three possible baud rates the information blocks are transmitted: "A1" and "inverted A1" indicating 1200 baud, "A2" and "inverted A2" indicating 2400 baud, and "A3" and "inverted A3" indicating 4800 baud. Additional code words could be added for additional possible baud rates. Portion 50 is transmitted at the baud rate of the information blocks to allow for bit and frame synchronization at the information block baud rate. In like manner to the bit and frame synchronization of portion 40, portion 50 comprises a plurality of bits 60 and a second plurality of bits 64 for bit synchronization. Two sixteen bit random pattern "C" words, "C" 62 and "inverted C" 66, are transmitted to allow frame synchronization at the information block baud rate. At 1200 baud, the pluralities of bits 60 and 64 comprise eight bits each. At all baud rates, the number of bits comprising "C" and "inverted C" remains constant at 16 bit each. Thus, as shown for 2400 baud, the number of bits comprising the bit synchronization portions 60' and 64' are increased to thirty two bits each. At 4800 baud, the number of bits comprising the bit synchronization portions 60" and 64" are increased to eighty bits each.

Referring to FIG. 1C, the information blocks 30 of the preferred embodiment used to transmit address and data information comprise an information array of eight code words 70. The transmission time of the information block is fixed irrespective of the transmission baud rate. Since the sync block 25 (FIG. 1B) is transmitted at 1200 baud for a total of 160 msec transmission time, the eighteen information blocks 30 each require 213 msec of transmission time. The structure of each code word 70 is a 31,21 BCH code word extended to a (32,21) BCH which provides for error detection and correction and comprises twenty-one information bits 75 and ten parity bits 80 calculated by a BCH generator polynomial well known to those skilled in the art. An eleventh parity bit 85 establishes even parity on the thirty-one bits. In the preferred embodiment, all address and data information blocks after the synchronization signal are of this structure. It should be appreciated that an alternate embodiment may use a different structure code word.

The information array is transmitted by column, thus "interleaving" the code words 70 contained in the array. Interleaving of the information block provides sixteen bits or, at 1200 baud, thirteen msec. of burst error protection (assuming 2 bits of error correction per code word). The interleaved code words is a characteristic of the signalling protocol of the preferred embodiment described herein but is not essential to the operation of the present invention.

Figure 2:
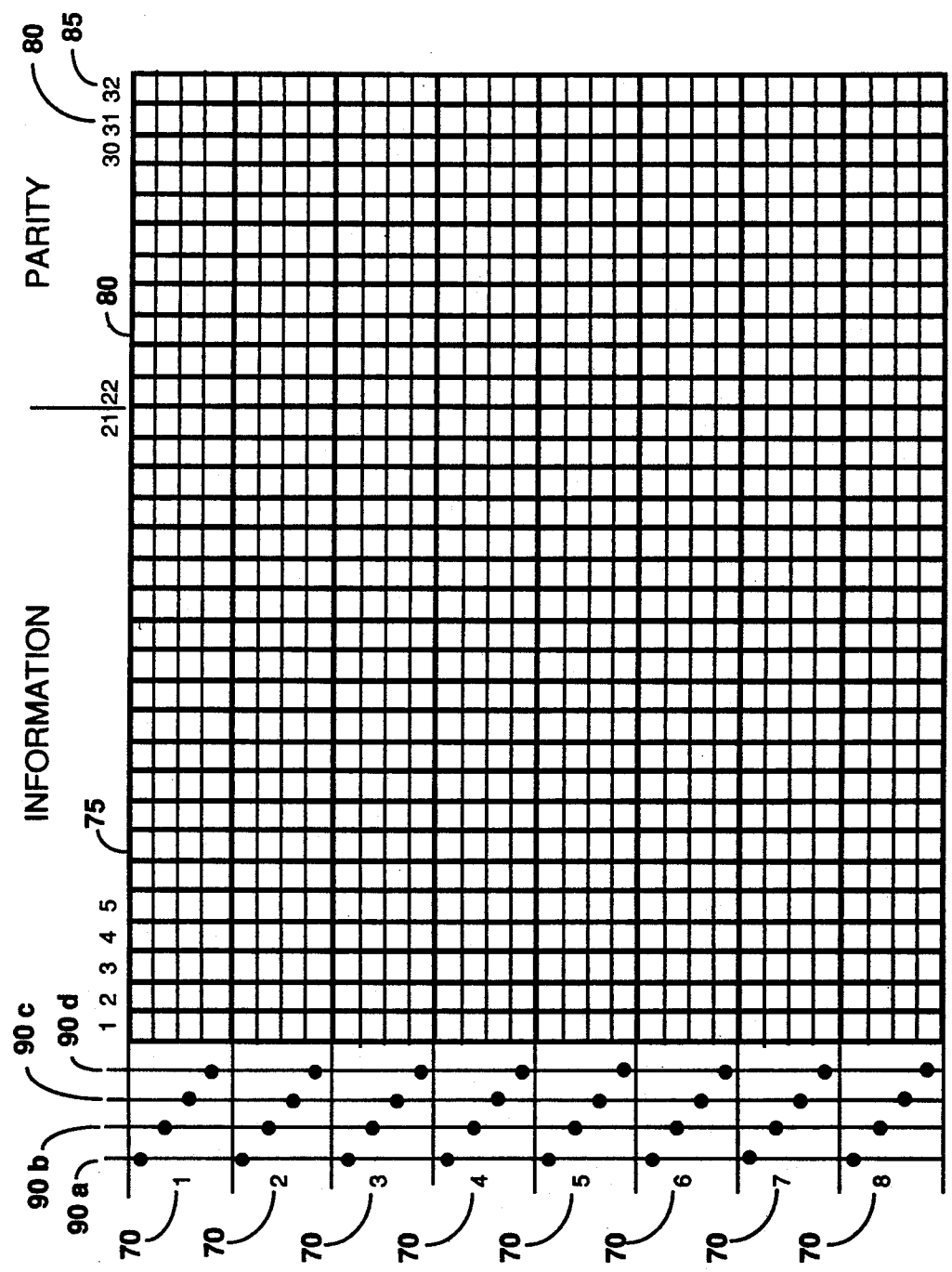
FIG. 2 is a diagram of the preferred embodiment of the phase interleaved signal according to the present invention.

Referring next to FIG. 2, in the preferred embodiment, the use of four phases 90a, 90b, 90c, and 90d provides easy accommodation of increased traffic. It is obvious to one skilled in the art that the number of phases could be increased to accommodate higher transmission baud rates. The number of phases is the greates multiple of the base baud rate permitted by the selective call system. In the preferred embodiment, the highest baud rate permitted is 4800 baud. Each phase comprises eight code words 70. Initially it is expected that the signalling protocol of the present invention will be used at the base baud rate of 1200 baud which is compatible with the infrastructure used in many of todays systems. As the number of subscribers increases the baud rate will be increased in multiples of two up to at least 4800 baud to accomodate this growth. At 1200 baud, the protocol is capable of supporting up to approximately 50,000 alphanumeric selective call receiver users (calculated from an average forty character messages and an average 0.15 calls per user hour), while at 4800 baud this number increases to 200,000 alphanumeric selective call receiver users. A change in baud rate may require certain aspects of the systems fixed infrastructure to be upgraded (e.g., higher transmitter power, more transmitters, more phase buffers (as described below), and higher baud rate modems). The service provider, though, can anticipate when, based on his growth rate, to upgrade his system to support these higher baud rates. It is desirable that the service provider be able to upgrade without causing any inconvenience to his existing customers. The selective call receivers described below allow the service provider to upgrade without requiring the users to make any changes to their selective call receivers.

The four phase information array is serially transmitted by column by time division multiplexing a number of phases, the number equivalent to the ratio of the transmission baud rate to the system base baud rate. In the preferred embodiment at the highest baud rate of 4800 baud, the four phases 90a, 90b, 90c, and 90d are multiplexed in addition to "interleaving" the code words 70 contained in the array. For example, the first bit 75 of the first information word 70 of the first phase 90a is transmitted followed by the first bit 75 of the first information word 70 of the second phase 90b. In like manner the bits in a first column 75 are transmitted. Next, the bits of the second column 75 are transmitted starting with the second bit of the first information word 70 of the first phase 90a. All 32 bit columns are similarly transmitted.

Since the transmission time of an information array is fixed at 213 msec. irrespective of the transmission baud rate, the number of code words contained in an information block is varied in direct ratio to the baud rate to maintain a fixed transmission time. At 1200 baud the information array contains eight (32,21) code words as shown in FIG. 1C. At 2400 baud the array would be composed of sixteen code words; and at 4800 baud, 32 code words would be contained in the array as shown in FIG. 2. The paging receiver decoder will determine the information block baud rate from the "A" words, synchronize to the information block baud rate during frame synchronization portion 50 of FIG. 1B, and then operate on only one phase of the multiplexed information based upon the baud rate and predetermined information, i.e., the two least significant bits of the address. In this manner, the signalling protocol permits system expansion via bit rate increases without requiring a pager recall. In addition to supporting multiple bit rates, the multirate protocol is structured to provide a constant amount of burst error protection in terms of the length of a burst error. Because the interleaving depth is varied in ratio to the baud rate, the amount of burst protection provided in terms of time remains fixed at thirteen msec.

Figure 3:
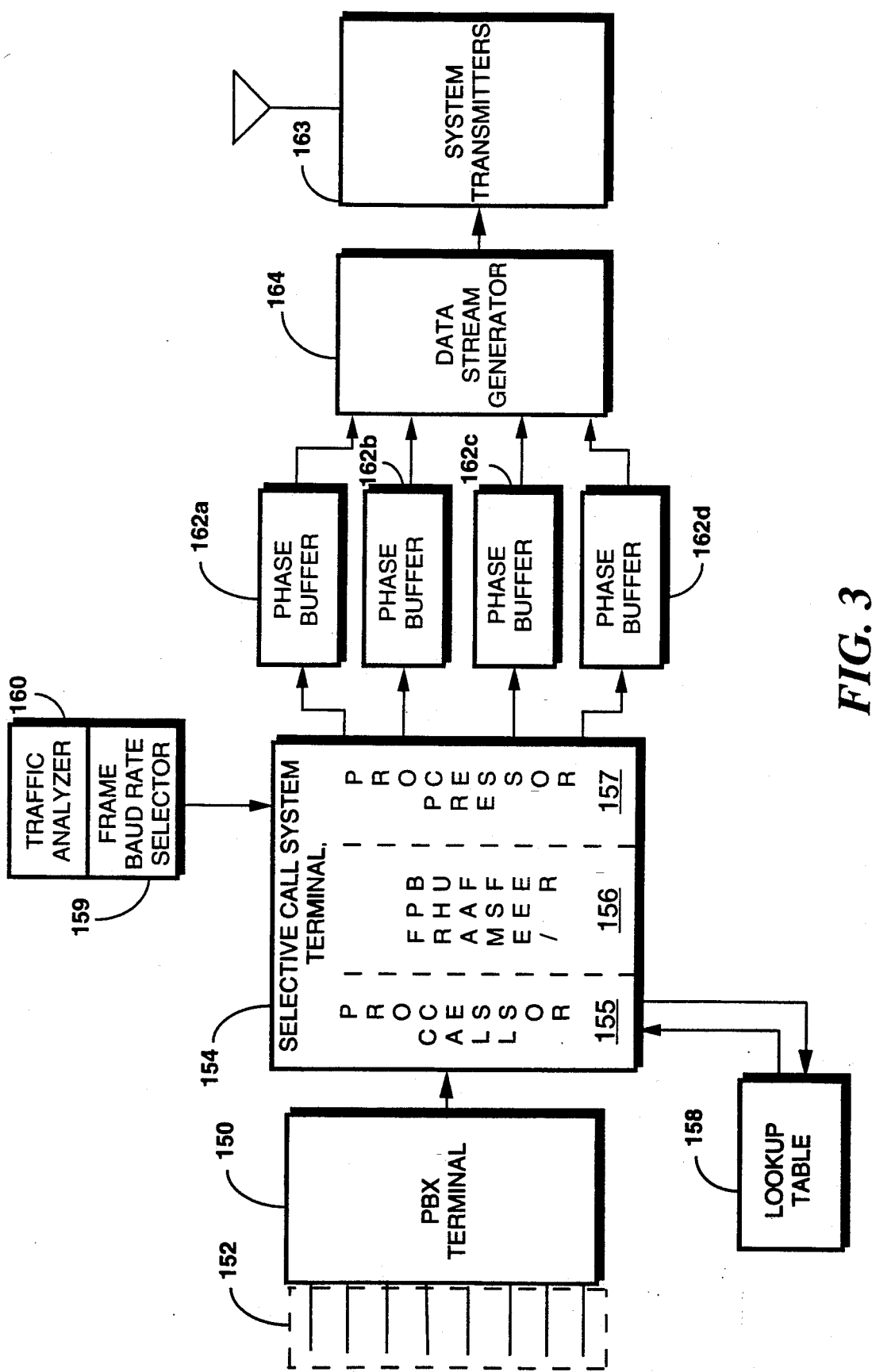
FIG. 3 is a block diagram of the preferred embodiment of the selective call network system encoder according to the present invention.

Referring to FIG. 3, a selective call system encoder to support the disclosed signalling protocol comprises a PBX terminal 150 coupled to a plurality of phone lines 152 for receiving selective call message information from message originators. The selective call message information is transmitted to a selective call system terminal 154. The selective call system terminal 154 comprises a call processor 155, a frame/phase buffer 156 and a pre-processor 157 which together perform the system terminal operations familiar to one skilled in the art and also perform the operations necessary to separate the selective call message information into the various phases and to interleave the code words as described above in reference to FIG. 1C.

The call processor 155 receives the selective call message information, accesses a lookup table 158 to determine the selective call address, the assigned phase and the assigned frames for the information, and stores the message information including the address, phase and frame information in the frame/phase buffer 156. The frames are the sixty four rotating frames 20 (FIG. 1A) and a phase is one of the four phases 90a, 90b, 90c and 90d. The lookup table 158 stores information on each of the selective call receivers which recieve transmissions from the system terminal. The information stored in the lookup table could be conventional information regarding whether the receiver receives alphanumeric data, numeric data, voice transmissions or tone activation codes. Additional information stored in the lookup table 158 comprises phase identification information identifying which of the four phases 90a, 90b, 90c and 90d (FIG. 2) the selective call receiver operates and frame identification information identifying the frame or frames in which selective call messages for the selective call receiver should be transmitted.

The phase identification information may be data independent of the selective call addresses of the selective call receiver or may be a subset of the information bits contained in the selective call address. To take full advantage of the invention, all addresses assigned to a selective call receiver should have the same decoding phase. It may be convenient to use the two least significant bits of the address to identify a decoding phase. Alternatively, a prefix or suffix digit associated with each address can be used. For example, in the preferred embodiment the phase identification information could be indicated by the two least significant bits of the selective call receiver address allowing for four possibilities (00, 01, 10, 11) as the preferred signalling protocol anticipates four possible phases, 90a, 90b, 90c and 90d (FIG. 2).

The frame/phase buffer 156 stores the message information in a manner allowing access by frame and phase. For example, portions of the buffer 156 could be assigned to each frame and, within that portion, a smaller portion could be assigned to each channel/phase. Alternatively, the message information could be stored in the buffer 156 in the order it is received with a portion of the buffer 156 set aside for storing address information referenced by the frame and channel so that when constructing the frame and channel, the message information can be addressed and extracted.

The pre-processor 157 then stores the selective call messages of each phase of the frame in one of four channel buffers. The pre-processor 157 constructs the sync block 25 (FIG. 1B) for each frame and then formats the channels into the interleaved eight code word format described above (FIG. 1C) for each phase of the frame.

The pre-processor 157 begins by storing a bit pattern representing the sync block at the beginning of all the phase buffers 162a, 162b, 162c and 162d followed by storing each phase of the frame in a particular one of the four phase buffers 162a, 162b, 162c and 162d. It is obvious to one skilled in the art that if the transmission baud rate could increase by more than a factor of four, the encoder would include more than four channel and phase buffers. The number of phase buffers required is the greatest multiple of the base baud rate permitted by the selective call system. A baud rate selector 159 provides baud rate information to the selective call system terminal 154 for use by the pre-processor 157 in constructing the sync block 25 and assigning the channels to one of the phase buffers 162a, 162b, 162c and 162d. The selective call system service provider can select a transmission baud rate.

Alternately, the transmission baud rate of a frame can be determined by a signal from a traffic analyzer 160 to the frame baud rate selector 159. The traffic analyzer analyzes the transmission traffic of the selective call system by either looking at the quantity of calls received or the quantity of messages transmitted in a manner well known to those skilled in the art. As the selective call system traffic increases, the frame baud rate selector 159 increases the transmission baud rate. Also, the traffic analyzer 160 can predict the quantity of traffic in a particular frame and signal the frame baud rate selector 159 to assign baud rates to individual frames based upon the information transmitted in the frame.

Table 1 shows to which phase buffers 162a, 162b, 162c or 162d the interleaved code words will be assigned by the pre-processor 157. In one embodiment, the phase is identified by the two least significant binary bits of the selective call address of the selective call message.

TABLE 1

| PHASE | BAUD RATE | PHASE BUFFER |
| --- | --- | --- |
| 00 | 1200 | 162a |
| 01 | 1200 | 162a |
| 10 | 1200 | 162a |
| 11 | 1200 | 162a |
| 00 | 2400 | 162a |
| 01 | 2400 | 162a |
| 10 | 2400 | 162b |
| 11 | 2400 | 162b |
| 00 | 4800 | 162a |
| 01 | 4800 | 162b |
| 10 | 4800 | 162c |
| 11 | 4800 | 162d |

At 1200 baud all of the phases will be assigned to the phase buffer 162a. At 2400 baud the phases will be assigned to phase buffer 162a or phase buffer 162b in response to the first bit of the two bit phase identification information. And at 4800 baud, the phases will be assigned to one of the four phase buffer 162a, 162b, 162c or 162d in response to the two bit phase identification information.

A data stream generator 164 time division multiplexes the information received from the four phase buffers 162a, 162b, 162c and 162d to form a serial data bit stream which is then provided to the system transmitters 163 for transmission within the selective call system.

Figure 4A:
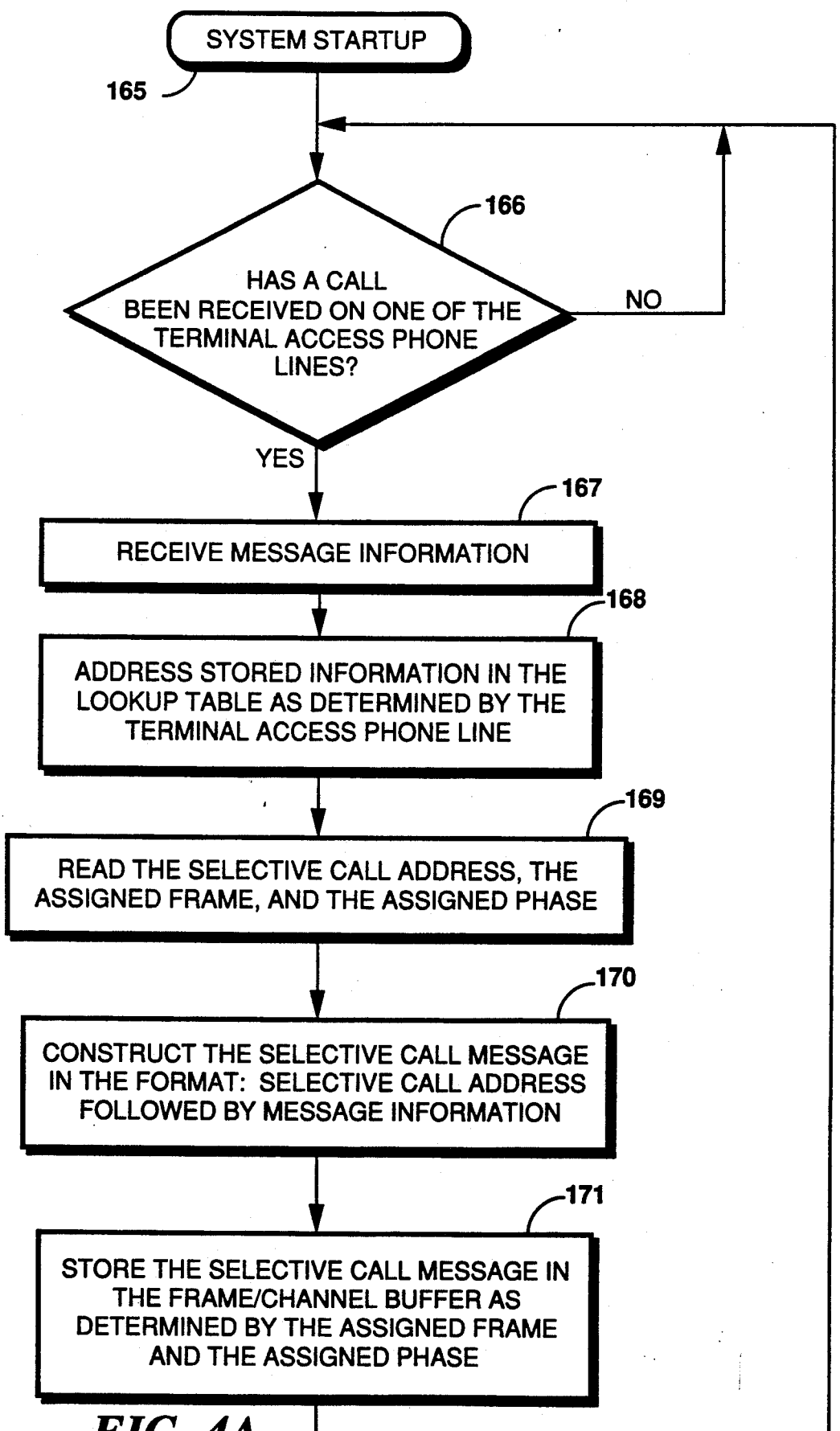
FIGS. 4A, 4B, 4C and 4D flowchart the operation of the selective call network system encoder according to the present invention.
Figure 4B:
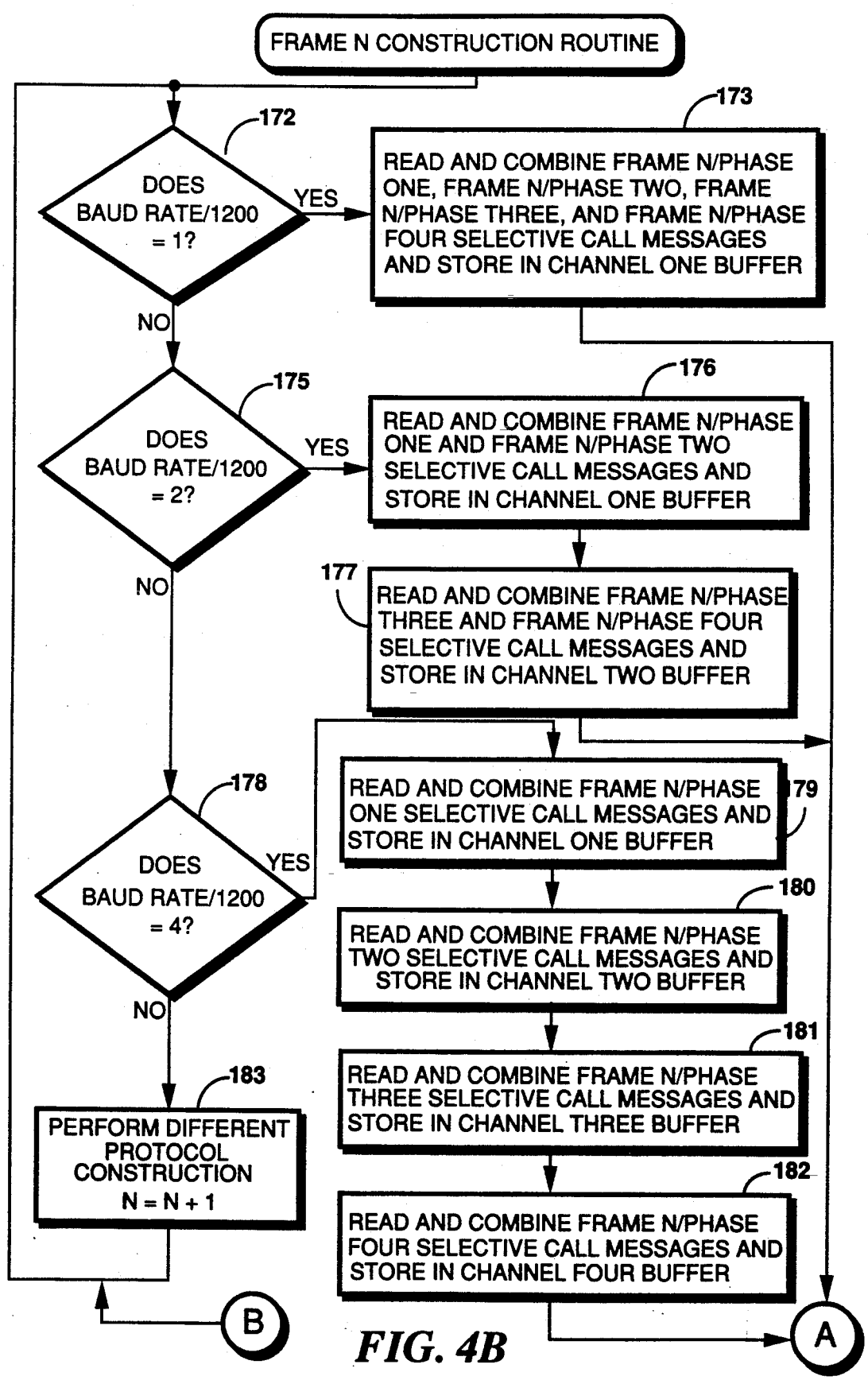
Figure 4C:
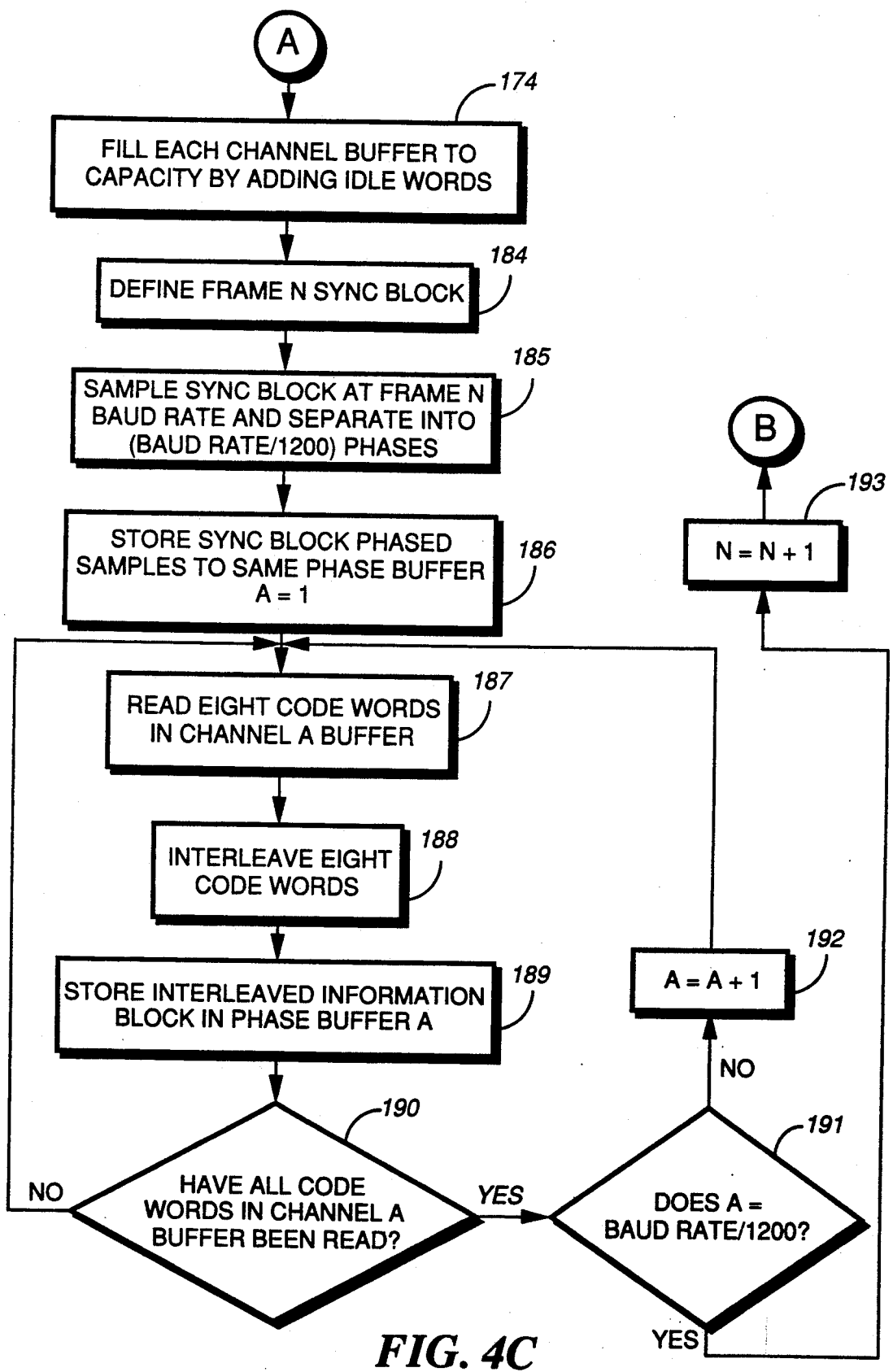
Figure 4D:
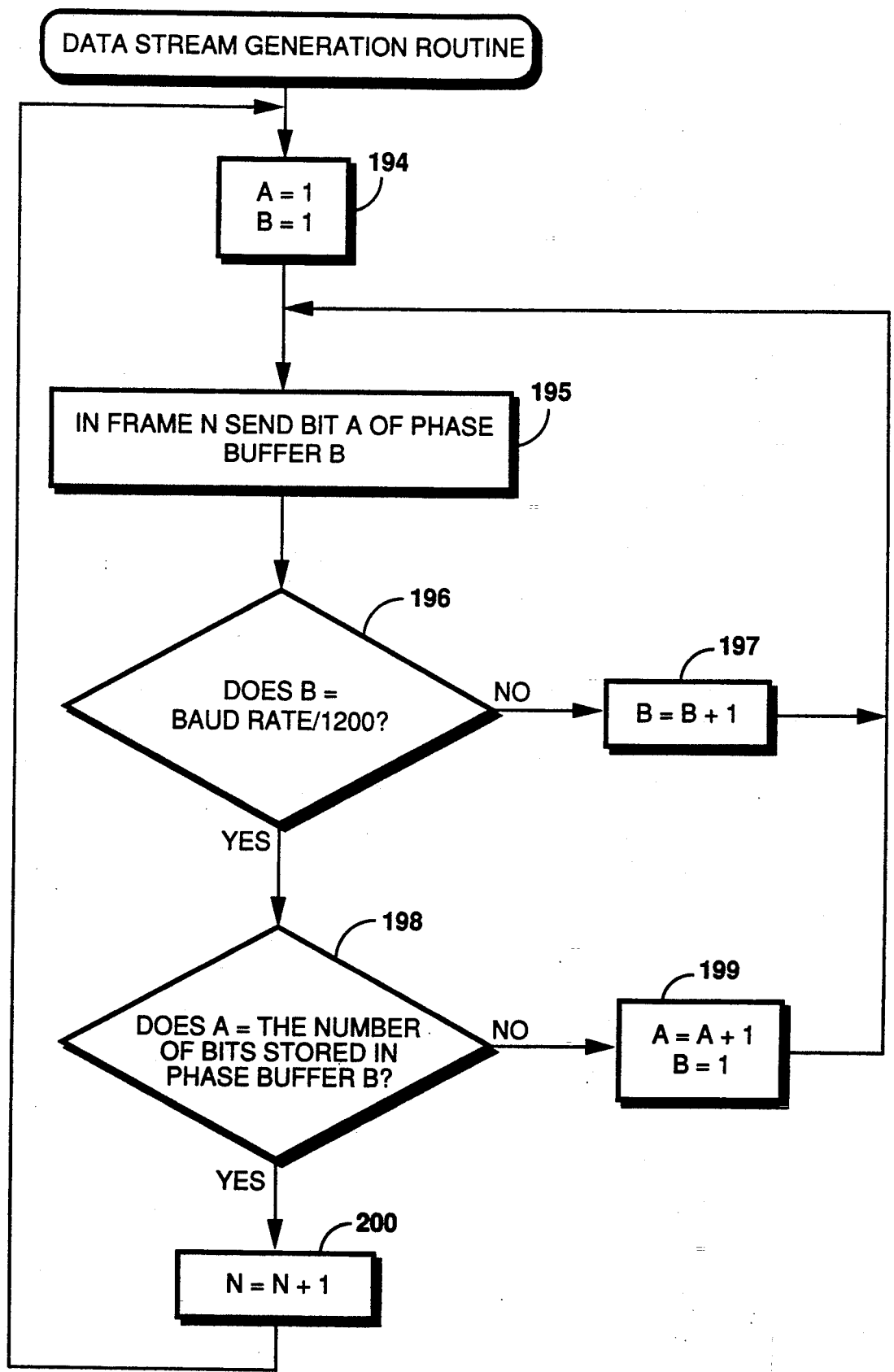

Referring to FIGS. 4A, 4B, 4C and 4D, three operations of the encoder are shown. FIG. 4A flowcharts the call processing and message storage operation of the call processor 155. FIGS. 4B and 4C flowchart the information block construction and phase allocation operation of the pre-processor 157. FIG. 4D flowcharts the serialization of the signal by the data stream generator 164.

Referring to FIG. 4A, after system startup 165 the call processing and message storage routine determines if a call is received from a selective call message originator on one of the terminal access phone lines 152 (FIG. 3). If no call is received 166, the routine idles in an idle loop awaiting the next call. When a call is received 166, the message information is received by the call processor 155 (FIG. 3). The terminal access phone line on which the call is received or other information provided by the message originator before the message information is received determines a particular address of information stored in the lookup table 158 (FIG. 3) identifying the selective call receiver and how it receives selective call messages 168. The call processor 155 reads, at the particular address in the lookup table 158, the selective call address of the selective call receiver, the frame in which the selective call message is to be transmitted, and the phase to which the selective call message is assigned 169. The selective call message is next constructed with the selective call address followed by the message information received 170. The selective call message is then stored in the frame/phase buffer 156 (FIG. 3) in a manner determined by the frame and phase assigned to the message 171. If the frame/phase buffer 156 is divided into portions for each phase of each frame, the selective call message is stored in a portion defined by the assigned phase and frame after messages previously stored therein. If the frame/phase buffer 156 has an addressing portion as described above, the selective call message is stored in the message portion of the buffer 156 after the last message received and the address of the stored selective call message is stored in the addressing portion at a location assigned to the particular phase of the particular frame. After storing the selective call message in the buffer 156, processing returns to the idle loop to await the next call 166.

Referring to FIGS. 4B and 4C, in the pre-processor 157 the frame construction routine for each frame N first examines the baud rate signal from the frame baud rate selector 159 (FIG. 3) to determine the transmission baud rate. If the baud rate signal indicates a transmission speed of 1200 baud 172, the selective call messages assigned to the first, second, third, and fourth phase of frame N are read from the frame/phase buffer 156 and combined in a manner determined by the signalling protocol 173. A first in/first out combination method could be employed or the combining of the messages could be determined by the selective call addresses or other information stored in the lookup table 158 (FIG. 3). The combined selective call messages are stored in the channel one buffer 173. If storage of the selective call messages in the channel buffer results in a partial message being stored therein, the information is deleted from the channel buffer and the selective call message will be processed in the next applicable frame. Idle words are then added to the channel one buffer and to the channel two, three and four buffers to completely fill the buffers 174.

If the baud rate signal indicates a transmission speed of 2400 baud 175, the selective call messages for phase one and phase two of the frame N are read and combined and stored in the channel one buffer 176. The selective call messages for phases three and four of the frame N are read and combined, and then stored in the channel two buffer 177. The empty portions of the four channel buffers are then filled with idle words 174. In a like manner, if the baud rate signal indicates that the transmission speed is 4800 baud 178, the selective call messages for phase one of the frame N are read and combined and stored in the channel one buffer 179, the selective call messages for phase two of the frame N are read and combined and stored in the channel two buffer 180, the selective call messages for phase three of the frame N are read and combined and stored in the channel three buffer 181, and the selective call messages for phase four of the frame N are read and combined and stored in the channel four buffer 182. The empty portions of the four channel buffers are then filled with idle words 174. If the baud rate signal indicates a transmission speed of other than 1200, 2400 or 4800 baud, a different signalling protocol construction method is employed for the frame N information and the frame counter N is incremented 183. Processing then returns to begin constructing the next frame.

After the four channel buffers are filled 174, the sync block 25 (FIG. 1B) for frame N is defined 184 from the frame number N and the baud rate signal from the frame baud rate selector 159 (FIG. 3). The sync block 25 is then divided up into sample phases, the number of which equals the baud rate divided by the base baud rate, 1200 baud. Each sample phase is then stored 185 in the first one hundred and ninety two bits of the corresponding phase buffer 162a, 162b, 162c or 162d. Thus, when the transmission speed is 1200 baud, the sync block is stored in the first one hundred and ninety two bits of the phase buffer 162a. For higher baud rates, the first one hundred forty eight bits (portions 40 and 45, FIG. 1B) are stored in each phase buffer followed by a specific sample phase of portion 50 (FIG. 1B). The specific sample phase stored in each phase buffer is synchronous to the phase of the messages to follow and a channel/phase counter A is initialized to one 186.

The first eight (32,21) BCH code words are read from the channel A buffer 187. The eight code words are interleaved 188 as described above (FIG. 1C) to form an information block 30 and the interleaved information block is stored in phase buffer A 189, where phase buffer one is the phase buffer 162a, phase buffer two is the phase buffer 162b, phase buffer three is the phase buffer 162c, and phase buffer four is the phase buffer 162d (FIG. 3). If all the code words in the channel A buffer have not been read 190, an additional eight code words are read 187, interleaved 188, and stored in phase buffer A 189. When all the code words in the channel A buffer have been read 190, the counter A is checked 191 to determine if all the channel buffers containing non-idle word information have been processed into the respective phase buffers (i.e., does A equal the maximum A defined as the transmission baud rate divided by the base baud rate?). If A does not equal the maximum A 191, A is incremented by one 192 and the next channel is processed and the information contained therein is stored in the respective phase buffer. When the counter A equals the maximum A 191, the frame counter N is incremented 193 and processing returns to the beginning of the frame construction routine to construct the next frame. In this manner it can be understood that the channel buffers are not written into until the necessary information has been read out of the buffers.

Referring to FIG. 4D, the interleaved information blocks stored in the phase buffers 162a, 162b, 162c and 162d are multiplexed bit-by-bit to form a serial data stream by the data stream generator 164 (FIG. 3). First, a bit counter A and a phase counter B are initialized to one 194. For Frame N, bit A of phase buffer B is added to the data stream sent to the system transmitters 195. The phase counter B is compared to a maximum phase counter to determine if the bits A stored in all applicable phase buffers (as determined by the transmission baud rate) have been multiplexed 196. If the phase counter B does not equal the maximum phase counter 196, the counter B is incremented by one 197 and the bit A of phase buffer 2 is added to the data stream 195 from the next phase buffer. If the phase counter B now equals the maximum phase counter 196 indicating that all phases of bit A have been multiplexed, the bit counter A is compared to the number of bits stored in the phase buffers to determine if all of the information blocks stored in all applicable phase buffers have been multiplexed 198. If the bit counter A does not equal the number of bits stored in the phase buffers 198, the counter A is incremented by one and the phase counter B is reinitialized to one 199. The next bit A from the phase buffer one is then added to the data stream 195. In this manner, the stream of data will comprise the multiplexed bits.

If the bit counter A equals the number of bits stored in the phase buffers 198, the frame counter N is incremented 200 and processing returns to the beginning of the data stream generation routine to serialize the next frame.

As would be obvious to one skilled in the art, synchronization of the various routines of the selective call system encoder is timed in a manner such that a frame of data stored in the phase buffer arrays 162a, 162b, 162c and 162d is multiplexed by the data stream generator 164 before new data is stored in the buffers.

Figure 5:
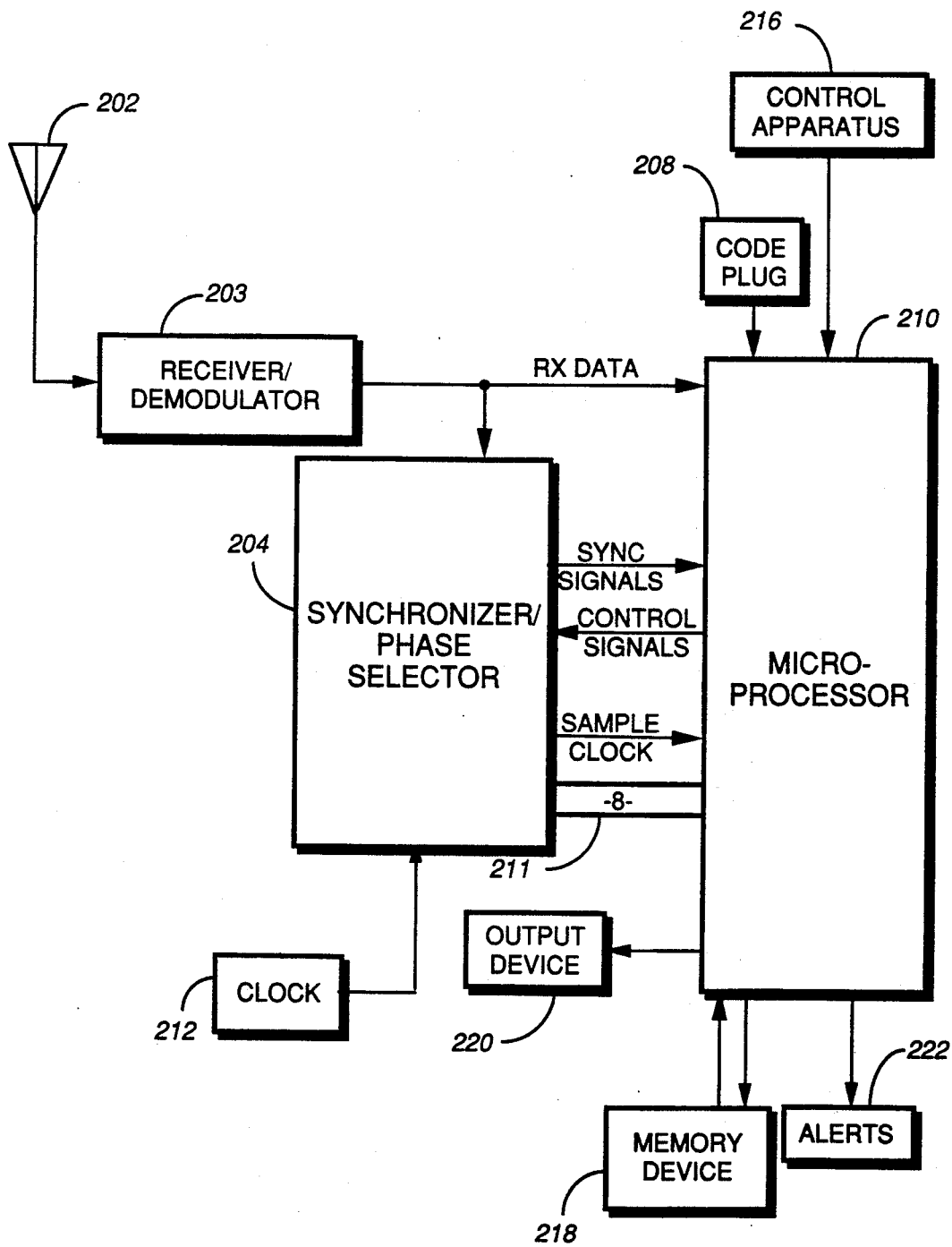
FIG. 5 is a block diagram of a selective call receiver according to the present invention.

Referring next to FIG. 5, in a selective call receiver according to the present invention, an antenna 202 receives an RF signal modulated with selective call address and message information. The signal is demodulated by receiver/demodulator circuitry 203. The demodulated signal is provided to a synchronizer/phase selector 204 and a microprocessor 210. The microprocessor 210 controls the operation of the synchronizer/phase selector 204 with control signals and control information provided on an eight bit bus 211. Synchronization operations performed by the synchronizer/phase selector 204 are synchronized to a clock 212. The control information provided on the eight bit bus 211 is derived in part from predetermined information stored in a code plug 208. The code plug 208 is a nonvolatile memory for storing option and control information such as the selective call receiver addresses. In the preferred embodiment, the predetermined information is the two least significant bits of the selective call address stored in the code plug 208. The predetermined information may, alternatively, be assigned independently of the address by using extra bits in the code plug 208.

Referring back to FIG. 2, the code words in the every fourth row of the thirty-two word array constitute one phase. The decoder of a selective call receiver according to the present invention operates on only one of the four phases that constitute the code word information array. By defining the phases and the code word information array in this manner, a constant amount of burst protection with very little increase in decoder complexity is achieved. Also, the size of the storage requirements and thereby the size and complexity of the selective call receiver are kept essentially constant and for all practical purposes the decoder continues to operate at an effective 1200 baud rate. Thus, the present invention uses the signalling protocol and an adaptive paging decoder to permit system expansion via bit rate increases without requiring a pager recall. Furthermore, despite supporting multiple bit rates, the multirate protocol is structured to keep the RAM and operating speed of the decoder essentially constant.

The microprocessor 210 reconstructs and decodes the individual code words and applies standard error correction and detection techniques, well known to those skilled in the art, the decoding is facilitated by synchronization signals (SYNC SIGNALS) and a sample clock provided from the synchronizer/phase selector 204. A control apparatus 216 for the microprocessor 210 comprises user selectable controls such as an ON/OFF control, a selective call message select control, and a selective call message recall control. The decoded message signals may be provided to an output device 220 or to a memory device 218 for storage and later output. The microprocessor 210 also activates alerts 222 in a manner well known to those skilled in the art. For a more detailed description of the structure and operation of a selective call receiver of the type shown in FIG. 5, reference is made to U.S. Pat. Nos. 4,518,961, 4,649,538, and 4,755,816, all commonly assigned to the same assignee as the present invention, and the teachings of which are hereby incorporated by reference.

Figure 6A:
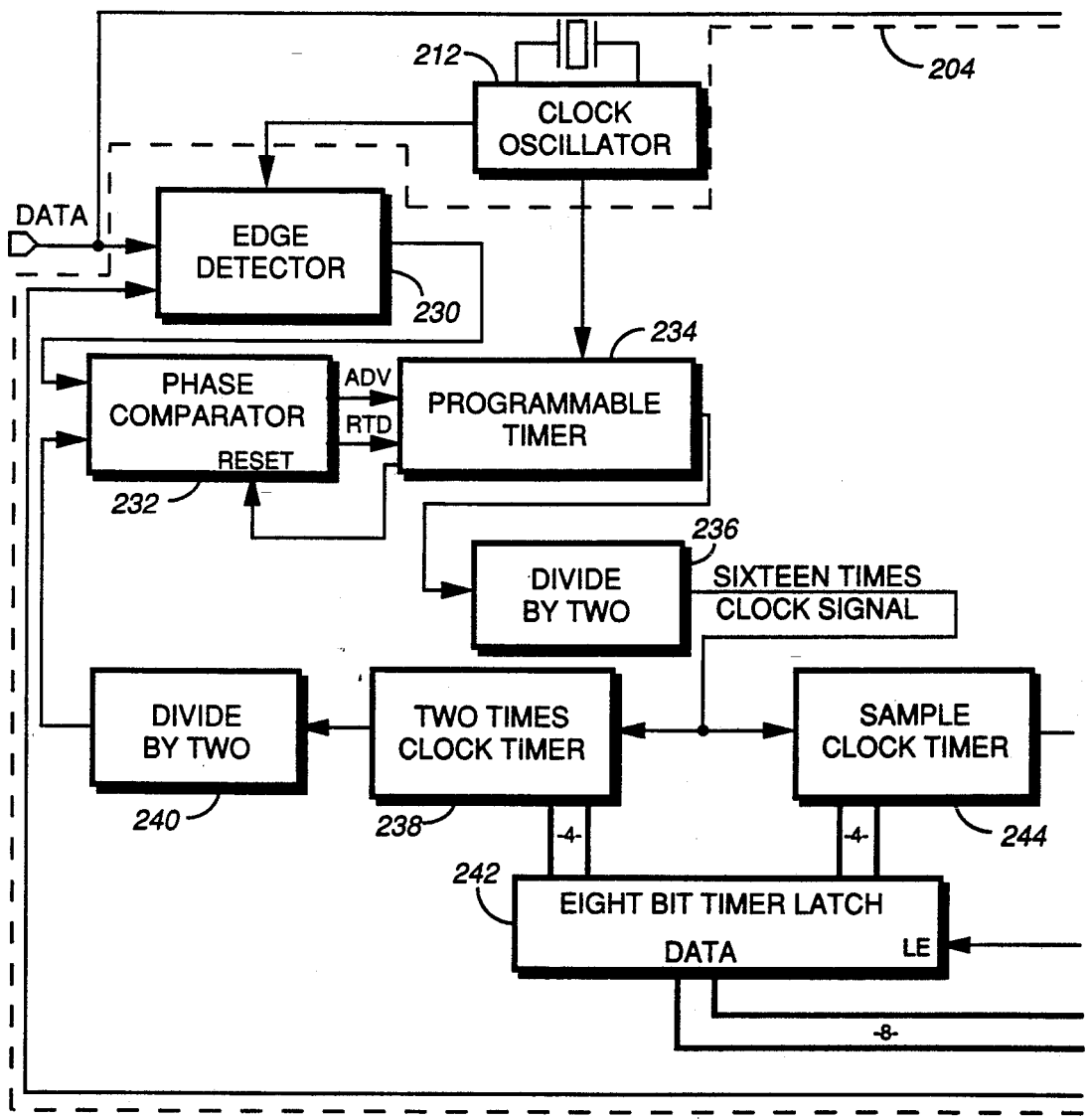
FIGS. 6A and 6B are a block diagram of a synchronizer/phase selector of the selective call receiver according to the present invention.
Figure 6B:
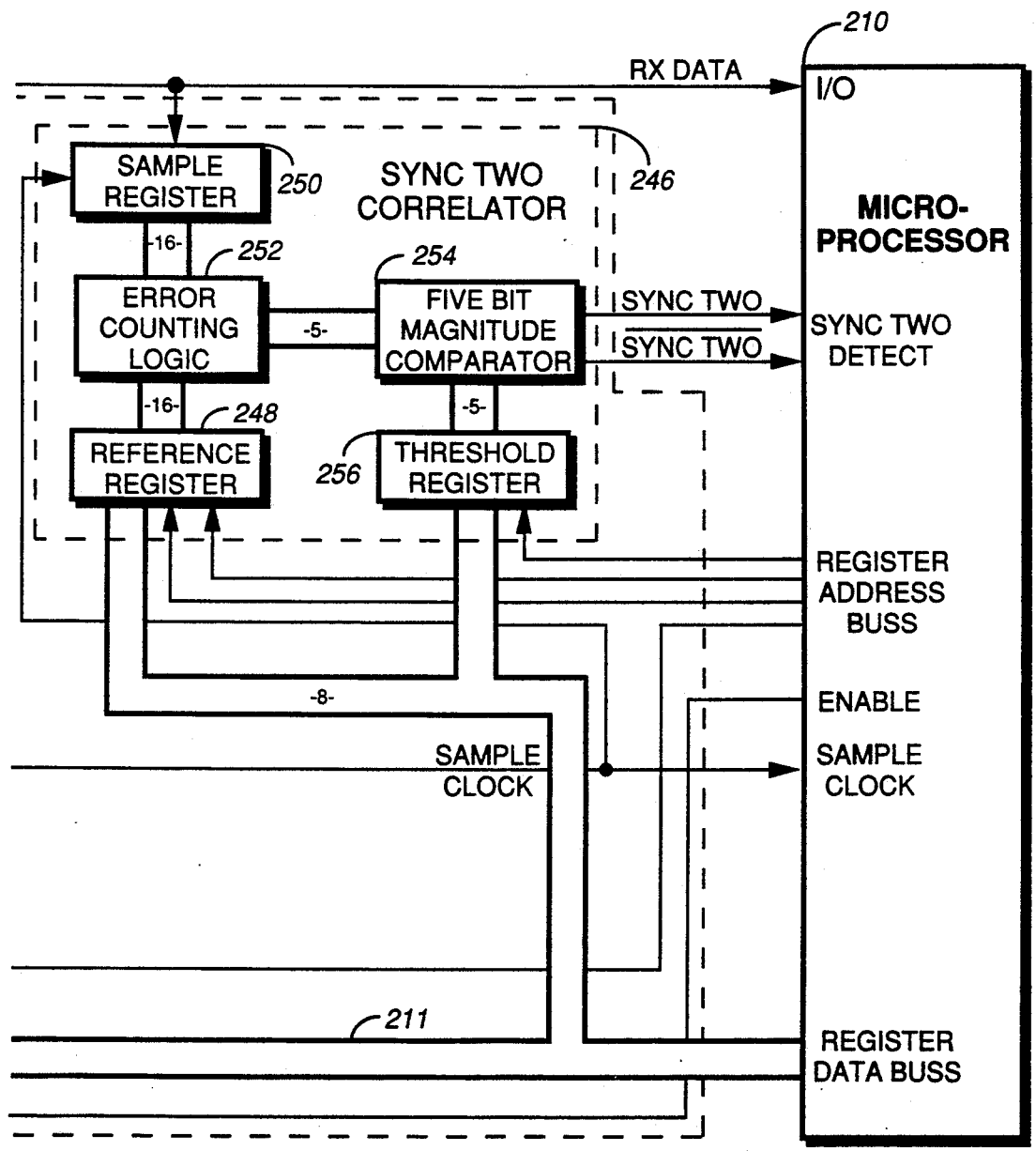

Referring next to FIG. 6, the synchronizer/phase selector 204 receives the demodulated signal at the input to an edge detector 230 which detects the presence of rising and falling edges in the demodulated signal. The operation of edge detector 230 is controlled by signals from the clock oscillator 212 and a reset enable signal, one of the control signals provided to the synchronizer/phase selector 204 from the microprocessor 210. The output from edge detector 230 is provided to a phase comparator 232 which is utilized in a first order phase lock loop to compare the detected edge with the regenerated bit clock provided by the phase lock loop to determine whether the bit clock is leading or lagging the edge detected. The phase comparator 232 provides an advance or retard signal to a programmable timer 234. The programmable timer 234 in response to the advance or retard signal, adds or deletes a small increment of time from the next time cycle. The timer 234 normally outputs a pulse every four clock cycles. A retard signal will alter the timer 234 such that six clock pulses are required to output a pulse, and an advance signal will alter the timer to produce a pulse every two clock cycles. After adding or deleting this increment of time, an output from the programmable timer 234 is used to clear the phase comparator and the timer will operate on its normal four clock cycle per pulse until the next advance or retard signal is generated by a new edge detect. The output of the programmable timer 234 is a square wave at sixteen times the 1200 baud bit rate. This sixteen times clock signal is provided to a two times clock timer 238 which produces a clock pulse at twice the baud rate, and thence to a divider 240 to provide a bit clock with clearly defined edges. The bit clock out of divider 240 is routed to the input of the phase comparator 232 to determine if the bit clock is lagging or leading the edge detector 230. The pulse rate of the two times clock 238 is controlled by four bits of an upper nibble of an eight bit timer latch 242. The timer latch 242 receives data on the eight bit data bus 211 from the microprocessor 210. The data in the eight bit timer latch is divided into the four bit upper nibble which provides data on a four bit data bus to the two times clock 238 and a four bit lower nibble which provides data on a four bit data bus to a sample clock timer 244. The value received from the timer latch 242 determines how many positive transitions of the sixteen times clock signal are required at the input of the two times clock timer 238 to trigger an output pulse from the timer 238. For example, if the latched value in the upper nibble is four when the two times clock timer 238 outputs a pulse, the next pulse will be triggered by the timer 238 upon the input of the fourth positive transition of the sixteen times clock signal.

The sixteen times clock signal is also provided as an input to the sample clock timer 244. The sample clock timer 244 receives four bits from the lower nibble of the eight bit timer latch 242 which controls the sample clock 244 pulse rate. The value received from the timer latch 242 determines how many positive transitions of the sixteen times clock signal are required at the input to the sample clock 244 to trigger an output pulse from the sample clock timer 244 in the manner described above. The output of the sample clock is provided to the microprocessor 210 for use during decoding of the frame information 45, and the interleaved information blocks. The sample clock signal allows the microprocessor 210 to decode the demodulated data at 1200 bits per second regardless of whether the demodulated signal is 1200 baud, 2400 baud or 4800 baud. The sample clock signal is also provided to a sample register 250 of a sync2 correlator 246. The sync2 correlator comprises the sample register 250 which receives the demodulated signal as data and a reference register 248 which receives data from the eight bit data bus 211. The reference register 248 and sample register 250 feed error counting logic 252, the output of which is coupled to one input of a five bit magnitude comparator 254. The error counting logic 252 compares, on a bit by bit basis, the corresponding bits of the sample register and the reference register and generates a five bit error sum ranging from zero to sixteen. A threshold register 256 which receives input from the eight bit data bus 211 provides the second input to the comparator 254.

The five bit magnitude comparator 256 compares the five bit error count sum generated by the error counting logic 252 to the two threshold values stored in the threshold register 256. In the preferred embodiment, the threshold values are set to allow a detection of the sync2 words with up to two errors. Thus if two or less errors are found then the sync2 word (i.e., "C") has been detected and the SYNC2 output from the comparator will be pulsed; whereas, if fourteen or more errors are found then the inverted sync2 word (i.e., "inverted C") has been detected and the inverted SYNC2 output from the comparator will be pulsed. The four least significant bits of the two threshold values, two (00010) and fourteen (01110) are stored in the threshold register 256 and the most significant bit is hardwired to 0. Block sync can be determined from either SYNC2 or inverted SYNC2. The reference register 248 comprises two eight bit registers wherein data is separately latched by two latch enable signals from the microprocessor 210. The thresholds are latched in the threshold register 256 by a third control signal from the microprocessor 210.

Referring next to FIGS. 7A, 7B, 7C, 7D, 7E, and 7F, a flow chart of the block synchronization and phase select routine of the synchronizer/phase selector 204 starts by initializing the data in the timer latch 242 (FIG. 6) with an eight to the upper and lower nibbles 300. The value stored in the upper nibble of timer latch 242 determines the number of sixteen times clock signal pulses that are counted before the two times clock 238 generates an output pulse; while the value stored in the lower nibble similarly controls the sample clock timer 244. These timers are loaded with the count numbers on the first clock transition after an enable from the microprocessor, and thereafter, the counters are reloaded on the falling edges of each output pulse. Bit synchronization is enabled at 302 and the edge detector awaits the first data transition 304. After the first transition occurs 304, the two times clock timer 238 and the sample clock timer 244 begin pulsing at the pulse rate determined by the values latched in the eight bit timer latch 242 (FIG. 6). After this first transition, the eight bit timer latch 242 is next loaded before the first output pulses of the two times clock timer 238 and the sample clock timer 244 with a value eight in the upper nibble and a value of sixteen in the lower nibble 306. This adjustment serves to align the two times clock timer 238 pulses with the center and edge of each bit, and align the sample clock 244 pulses with the center of each bit. Referring once again to FIG. 7A, the first thirty-one bit data samples are collected 308 and a counter SYNC1 SEARCH TIMER which counts the bit data samples, to be examined before the "A" word search is abandon, is initially set equal to one hundred sixty-one 310. The next bit data sample is taken and the completed thirty-two bit data word sample is correlated with the "A" words to determine if an "A" word, designating the baud rate at which the information block is transmitted, appears in the transmitted data 312. If the A1 word is detected 314 the information block transmission speed is 1200 baud a counter DELAY FLAG is set to forty-eight 316. If the inverted A1 word is detected 318, the information block transmission speed is 1200 baud a counter DELAY FLAG is set to forty-eight 316. If the inverted A1 word is detected 318, the information block transmission speed is 1200 baud and DELAY FLAG is set to zero 320. Likewise, if the A2 word or the inverted A2 word is detected, 322 or 326, the information block transmission speed is 2400 baud and DELAY FLAG is set to forty-eight or zero, 324 or 328, respectively. Similarly, detection of the A3 word 330 or the inverted A3 word 334 determines that the baud rate is 4800 baud and DELAY FLAG is set equal to forty-eight or zero, 332 or 336, respectively. If none of the "A" words have been detected in the thirty-two bit data sample, the SYNC1 SEARCH TIMER is decremented by one 338. The SYNC1 SEARCH TIMER allows for one hundred ninety two bits (the size of the sync block 25 (FIG. 1B)) to be examined in a search for one of the thirty-two bit "A" words in the demodulated data.

Until SYNC1 SEARCH TIMER equals zero 340, the microprocessor continues to take additional data samples 312 and compares the latest thirty-two bit data word sample to the "A" words. If an "A" word has not been found and SYNC1 SEARCH TIMER is decremented to zero 340, processing will await receipt of the next frame in which information could be transmitted for the selective call receiver 342 and then restart the block synchronization and base select routine at step 300.

Once the baud rate has been determined and FLAG DELAY has been set, the routine must next decode the frame information word and adjust the bit sampling rate to the information block transmission speed. If DELAY FLAG is not zero 344, the bit samples are counted and DELAY FLAG is decremented by one for each bit sampled 346 until DELAY FLAG equals zero 344. When DELAY FLAG equals zero 344, thirty-one bit data samples are collected 348. If the information block transmission speed is 2400 baud 352, the eight bit timer latch 242 (FIG. 6) is loaded with an eight in the upper nibble and a twelve in the lower nibble 354. If the information block transmission speed is 4800 baud 356, the timer latch 242 is loaded with an eight in the upper nibble and a ten in the lower nibble 358. The thirty-second sample is collected and the thirty-two bit sample of the frame information word is decoded 360.

Figure 7A:
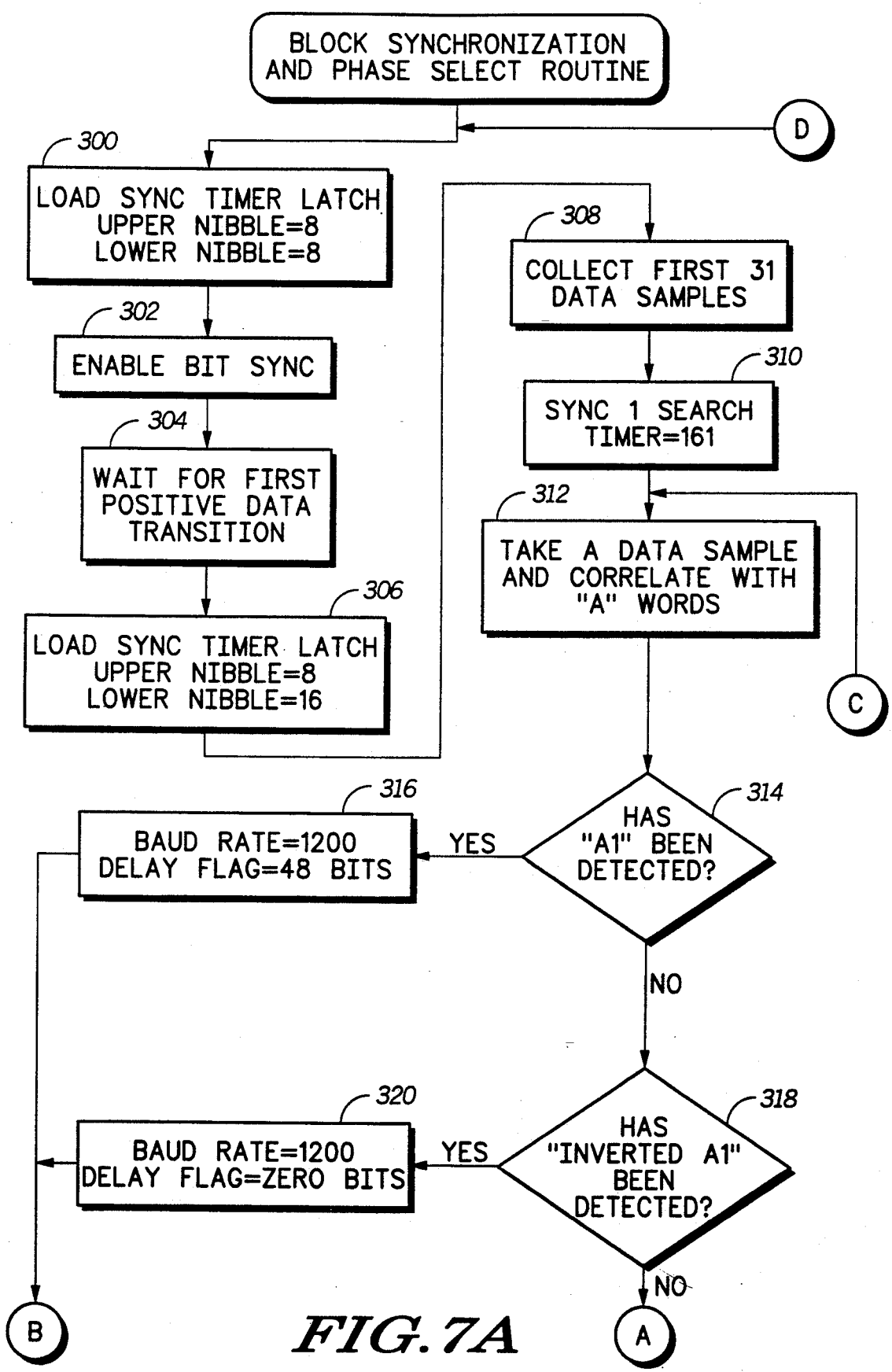
FIGS. 7A, 7B, 7C, 7D, 7E and 7F flowchart the operation of the synchronizer/phase selector according to the present invention.
Figure 7B:
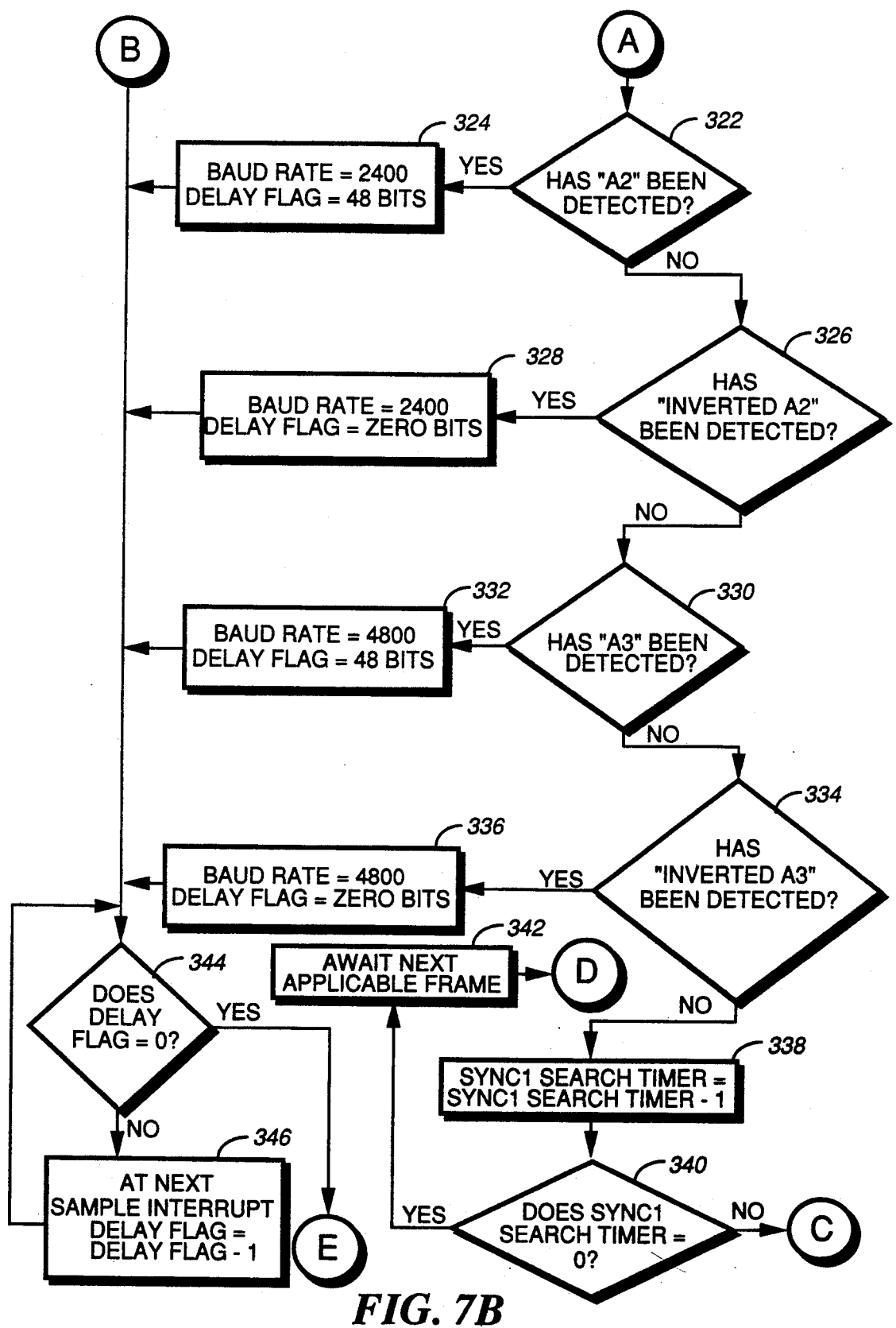
Figure 7C:
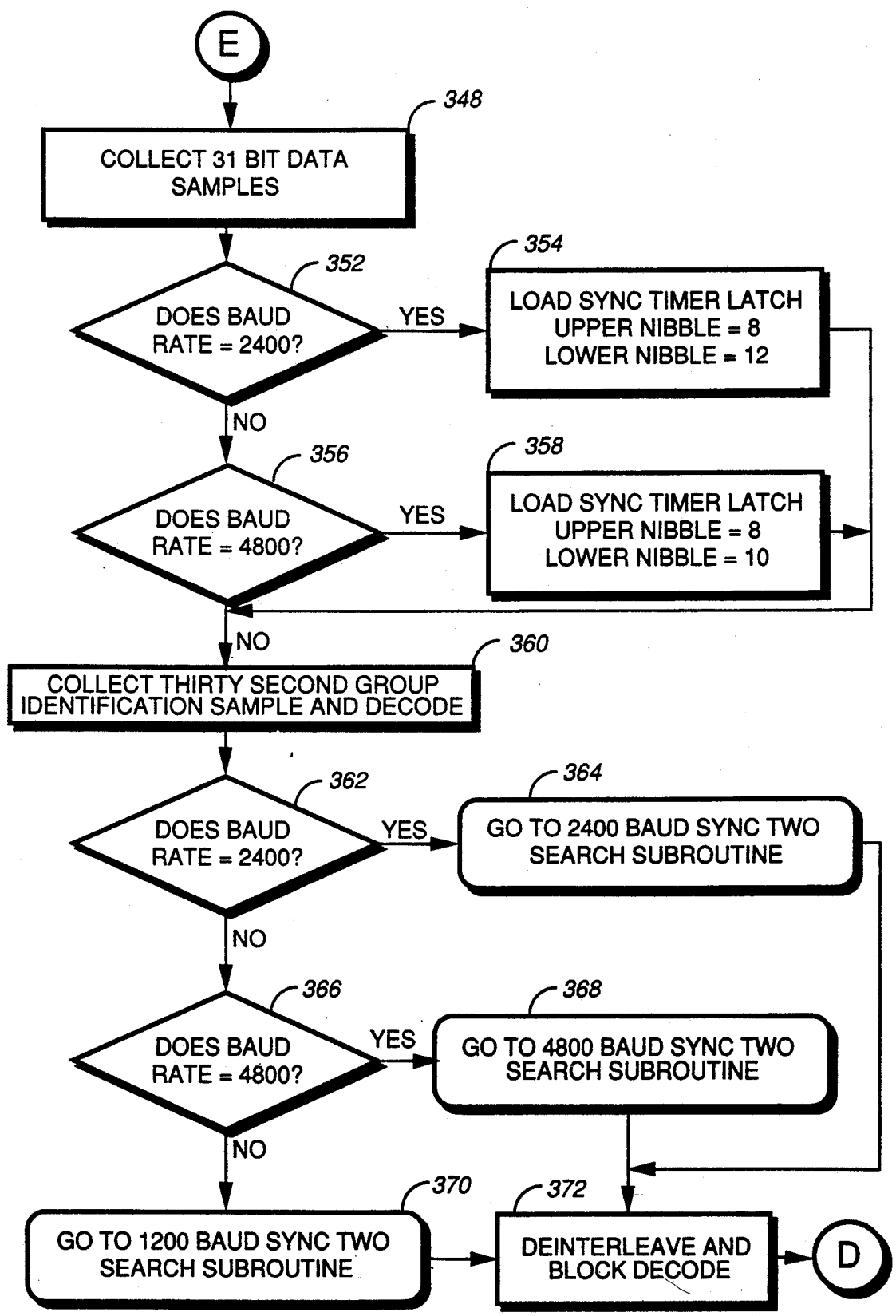
Figure 7D:
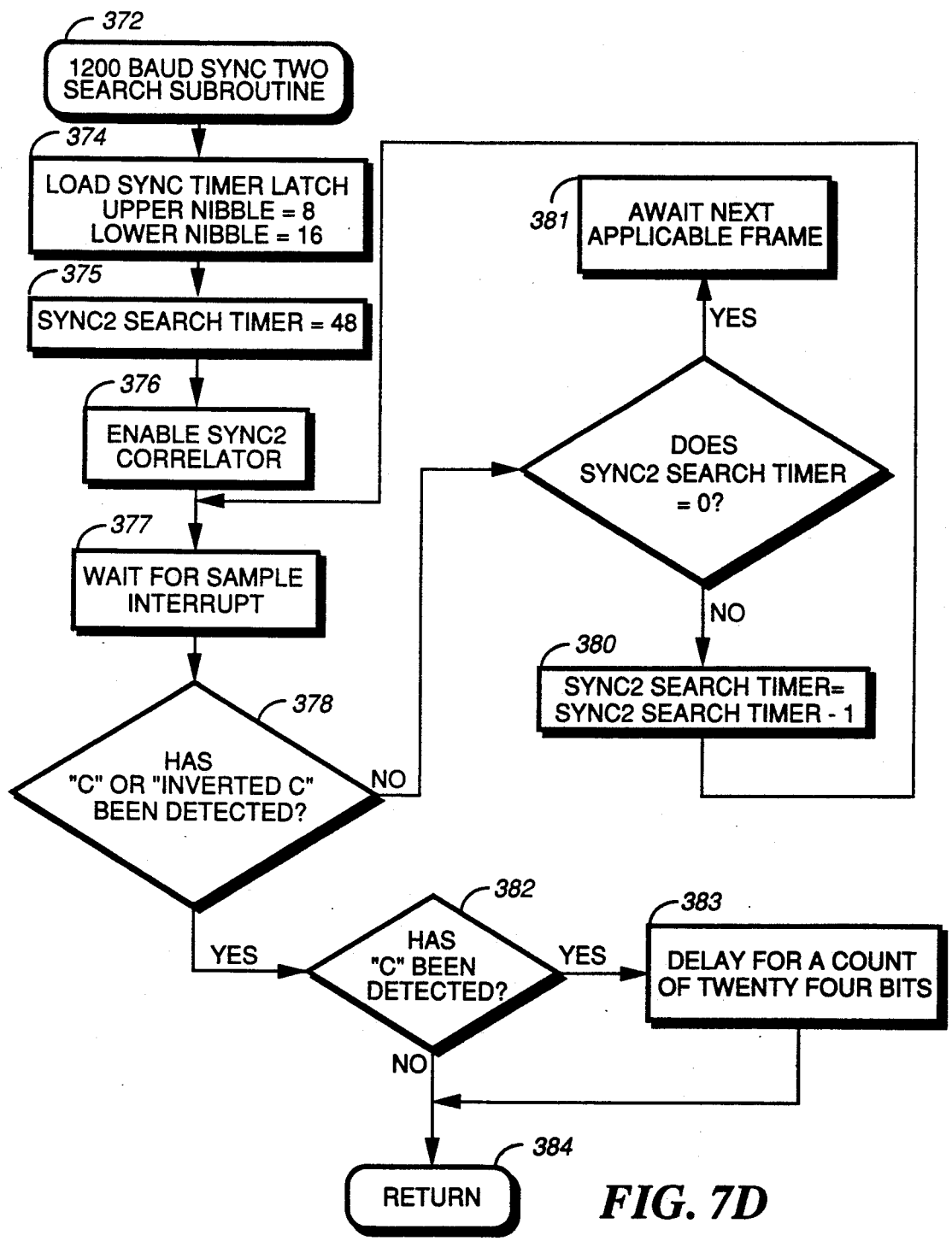
Figure 7E:
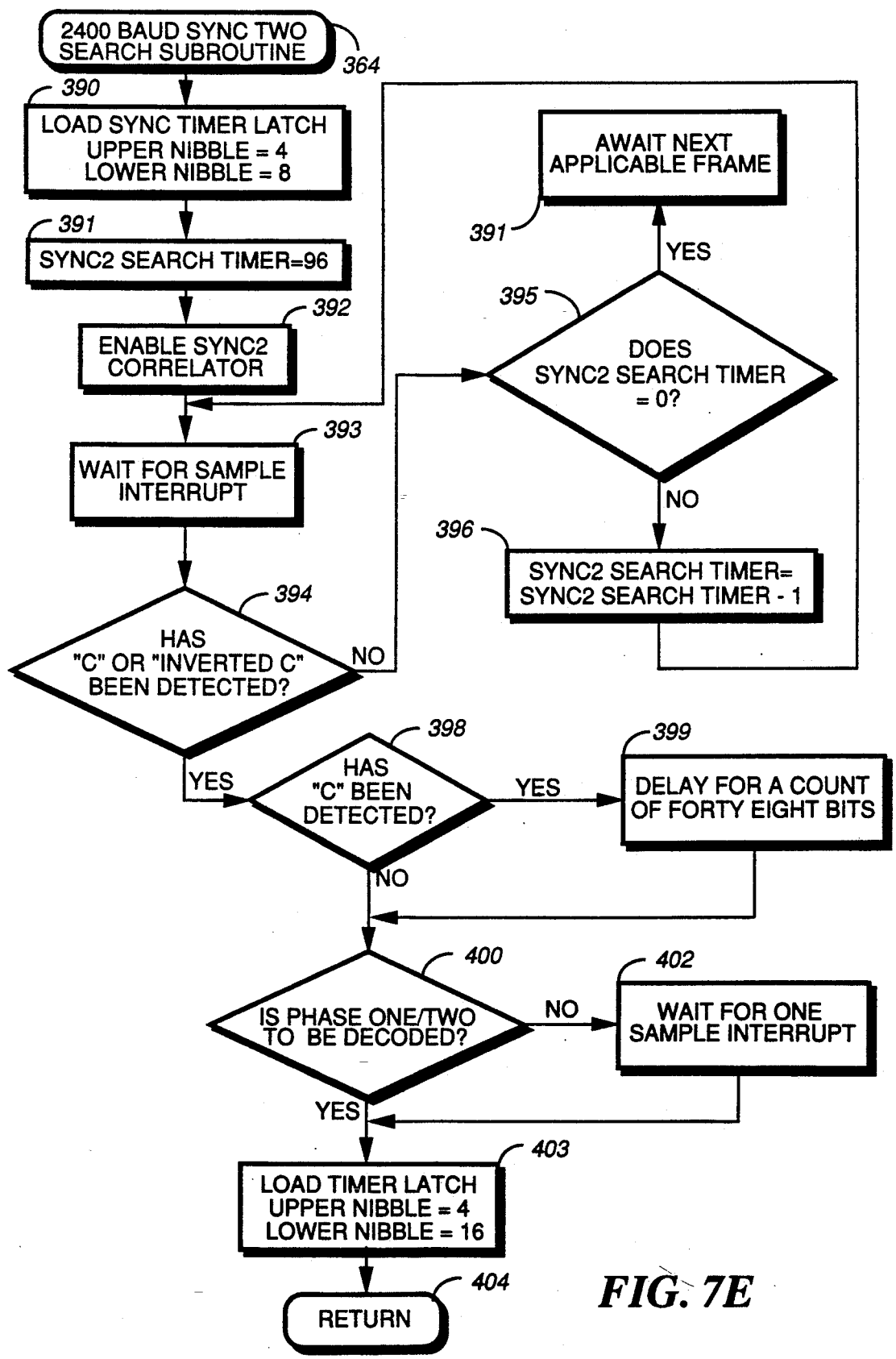
Figure 7F:
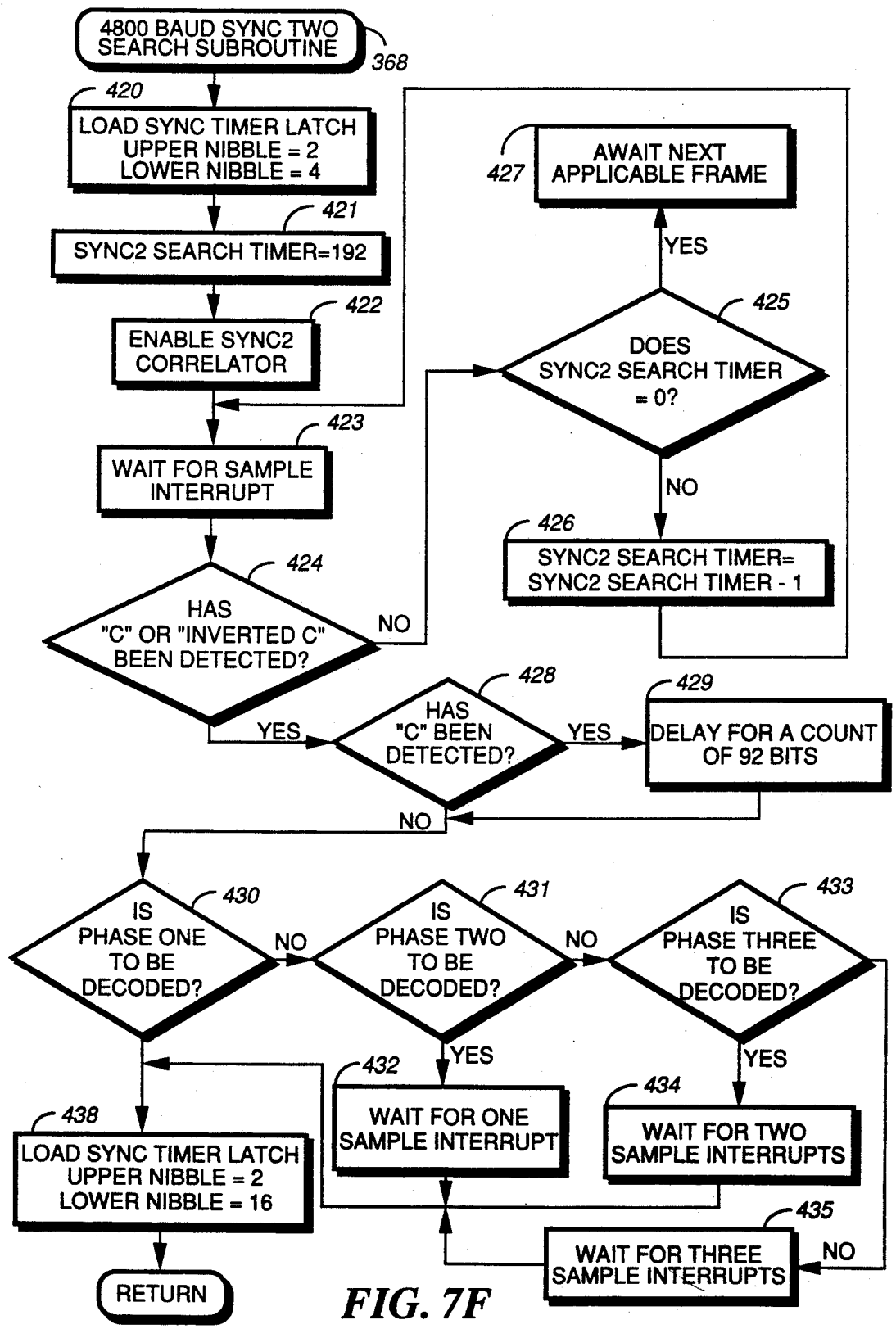

In the preferred embodiment of the present invention three information block baud rates are possible. If the information block transmission speed is 2400 baud 362 the 2400 baud sync2 search subroutine 364 is performed (FIG. 7E). If the information block transmission speed is determined to be 4800 baud 366, the 4800 baud sync2 search subroutine is performed 368 (FIG. 7F). Otherwise the information block transmission speed is assumed to be 1200 baud and the 1200 baud sync2 search subroutine 370 is performed (FIG. 7D). After performing the appropriate sync2 search subroutine, the sample clock signal phase is selected and the sample clock is pulsed at the 1200 bits per second baud rate to control the deinterleave and block decode routines of the microprocessor 372.

Referring to FIG. 7D, the 1200 baud sync2 search subroutine 370 starts by loading the eight bit timer latch 242 (FIG. 6) with an eight value in the upper nibble and a sixteen value in the lower nibble 374. A counter SYNC2 SEARCH TIMER is set to forty-eight (the number of bits in the sync2 bit synchronization portion 50 (FIG. 1B) at 1200 baud) 375 and the sync2 correlator is enabled 376. When a sample interrupt occurs 377, the data bits sampled are compared with the "C" words and it is determined whether "C" or "inverted C" have been detected 378.

If "C" or "inverted C" have not been detected 378, and SYNC2 SEARCH TIMER is not equal to zero 379, SYNC2 SEARCH TIMER is decremented by one 380 and the five bit magnitude comparator 254 (FIG. 6) awaits the next sample interrupt 377. If "C" or "inverted C" have not been detected 378 and SYNC2 SEARCH TIMER equals zero 379, processing awaits the next frame of the demodulated signal in which information for the selective call receiver should appear 381 at which time the bit synchronization and base select routine is begun again 300.

If one of the "C" words have been detected 378 and the "C" word is "C" 382, processing delays for twenty-four bits 383 until the end of the sync block 25 (FIG. 1B) at which time processing returns 384 to the deinterleave and block decode step 372, sending a SYNC2 signal from the synchronizer/phase selector 204 to the microprocessor 210 (FIG. 6). The sample clock will then produce a sample clock signal controlling the bit sample function of the microprocessor 210 (FIG. 6) in the middle of each bit of the demodulated signal at 1200 baud. If the "C" word detected 378 is not "C" 382, i.e., the detected "C" word is "inverted C" which occurs at the end of sync block 25, there is no delay before returning 384 to the block synchronization and phase select routine at the deinterleave and block decode at 372, sending an inverted SYNC2 signal to the microprocessor at which point the microprocessor will begin sampling the bits of the demodulated signal, deinterleaving the sampled bits, and decoding the information block in a manner well known to those skilled in the art.

Referring next to FIG. 7E, the 2400 baud sync2 search subroutine 364 starts by loading the eight bit timer latch 242 (FIG. 6) with a four value in the upper nibble and an eight value in the lower nibble 390. A counter SYNC2 SEARCH TIMER is set to ninety-six (the number of bits in the sync2 bit synchronization portion 50 (FIG. 1B) at 2400 baud) 391 and the sync2 correlator is enabled 392. When a sample interrupt occurs 393, the data bits sampled are compared with the "C" words and it is determined whether "C" or "inverted C" have been detected 394.

If "C" or "inverted C" have not been detected 394, and SYNC2 SEARCH TIMER is not equal to zero 395, SYNC2 SEARCH TIMER is decremented by one 396 and the five bit magnitude comparator 254 (FIG. 6) awaits the next sample interrupt 393. If "C" or "inverted C" have not been detected 394 and SYNC2 SEARCH TIMER equals zero 395, processing awaits the next frame of the demodulated signal in which information for the selective call receiver should appear 397 at which time the bit synchronization and base select routine is begun again 300.

If one of the "C" words have been detected 394 and the "C" word is "C" 398, processing delays for forty-eight bits 399 until the end of the sync block 25 (FIG. 1B) and sends a SYNC2 signal from the synchronizer/phase selector 204 to the microprocessor 210 (FIG. 6). If the "C" word detected 394 is not "C" 398, i.e., the detected "C" word is "inverted C" which occurs at the end of sync block 25, there is no delay before sending an inverted SYNC2 signal to the microprocessor. Processing next determines if phase one/two is to be decoded 400. If phase one/two is not to be decoded 400, processing awaits one sample interrupt 402 before loading the upper nibble of the sync timer latch 242 (FIG. 6) with a four and the lower nibble with a sixteen 403. In this manner, the sample clock will produce a sample clock signal at 1200 baud controlling the bit sample function of the microprocessor 210 (FIG. 6) in the middle of each phase three/four bit of the demodulated signal. If phase one/two is to be decoded 400, the eight bit timer latch 242 is loaded with a four in the upper nibble and a sixteen in the lower nibble 403 without a delay, such that the sample clock will produce a sample clock signal at 1200 baud controlling the bit sample function of the microprocessor 210 (FIG. 6) in the middle of each phase one/two bit at 1200 baud. The processing then returns 404 to the block synchronization and phase select routine at step 372.

Referring to FIG. 7F, the 4800 baud sync2 search subroutine 368 starts by loading the eight bit timer latch 242 (FIG. 6) with a two value in the upper nibble and an four value in the lower nibble 420. A counter SYNC2 SEARCH TIMER is set to one hundred ninety two (the number of bits in the sync2 bit synchronization portion 50 (FIG. 1B) at 4800 baud) 421 and the sync2 correlator is enabled 422. When a sample interrupt occurs 423, the data bits sampled are compared with the "C" words and it is determined whether "C" or "inverted C" have been detected 424.

If "C" or "inverted C" have not been detected 424, and SYNC2 SEARCH TIMER is not equal to zero 425, SYNC2 SEARCH TIMER is decremented by one 426 and the five bit magnitude comparator 254 (FIG. 6) awaits the next sample interrupt 423. If "C" or "inverted C" have not been detected 424 and SYNC2 SEARCH TIMER equals zero 425, processing awaits the next frame of the demodulated signal in which information for the selective call receiver should appear 427 at which time the bit synchronization and base select routine is begun again 300.

If one of the "C" words have been detected 424 and the "C" word is "C" 428, processing delays for ninety-two bits 429 until the end of the sync block 25 (FIG. 1B) and sends a SYNC2 signal from the synchronizer/phase selector 204 to the microprocessor 210 (FIG. 6). If the "C" word detected 424 is not "C" 398, i.e., the detected "C" word is "inverted C" which occurs at the end of the sync block 25, there is no delay before sending an inverted SYNC2 signal to the microprocessor 210. Processing next determines if phase one is to be decoded 430. If phase one is to be decoded 430, the eight bit timer latch 242 is loaded with a two in the upper nibble and a sixteen in the lower nibble 438 without a delay, such that the sample clock will produce a sample clock signal at 1200 baud controlling the bit sample function of the microprocessor 210 (FIG. 6) in the middle of each phase one bit. If phase one is not to be decoded 430, and if phase two is to be decoded 431, processing awaits one sample interrupt 432 before loading the upper nibble of the sync timer latch 242 (FIG. 6) with a two and the lower nibble with a sixteen 438. In this manner, the sample clock will produce a sample clock signal at 1200 baud (controlling the bit sample function of the microprocessor 210 (FIG. 6)) in the middle of each phase two bit of the demodulated signal. In other words, the microprocessor 210 is able to process the data at a constant rate using the same algorithm independent of the channel baud rate. If phase one 430 and phase two 431 are not to be decoded, and if phase three is to be decoded 433, processing awaits two sample interrupts 434 before loading the upper nibble of the sync timer latch 242 (FIG. 6) with a two and the lower nibble with a sixteen 438. In this manner, the sample clock will produce a sample clock signal at 1200 baud controlling the bit sample function of the microprocessor 210 (FIG. 6) in the middle of each phase three bit of the demodulated signal. Finally, if phase one 430, phase two 431, and phase three 433 are not to be decoded, it is assumed that the selective call receiver decodes on phase four and processing awaits three sample interrupts 435 before loading the upper nibble of the sync timer latch 242 (FIG. 6) with a two and the lower nibble with a sixteen 438. In this manner, the sample clock will produce a sample clock signal at 1200 baud controlling the bit sample function of the microprocessor 210 (FIG. 6) in the middle of each phase four bit of the demodulated signal.

Figure 8A:
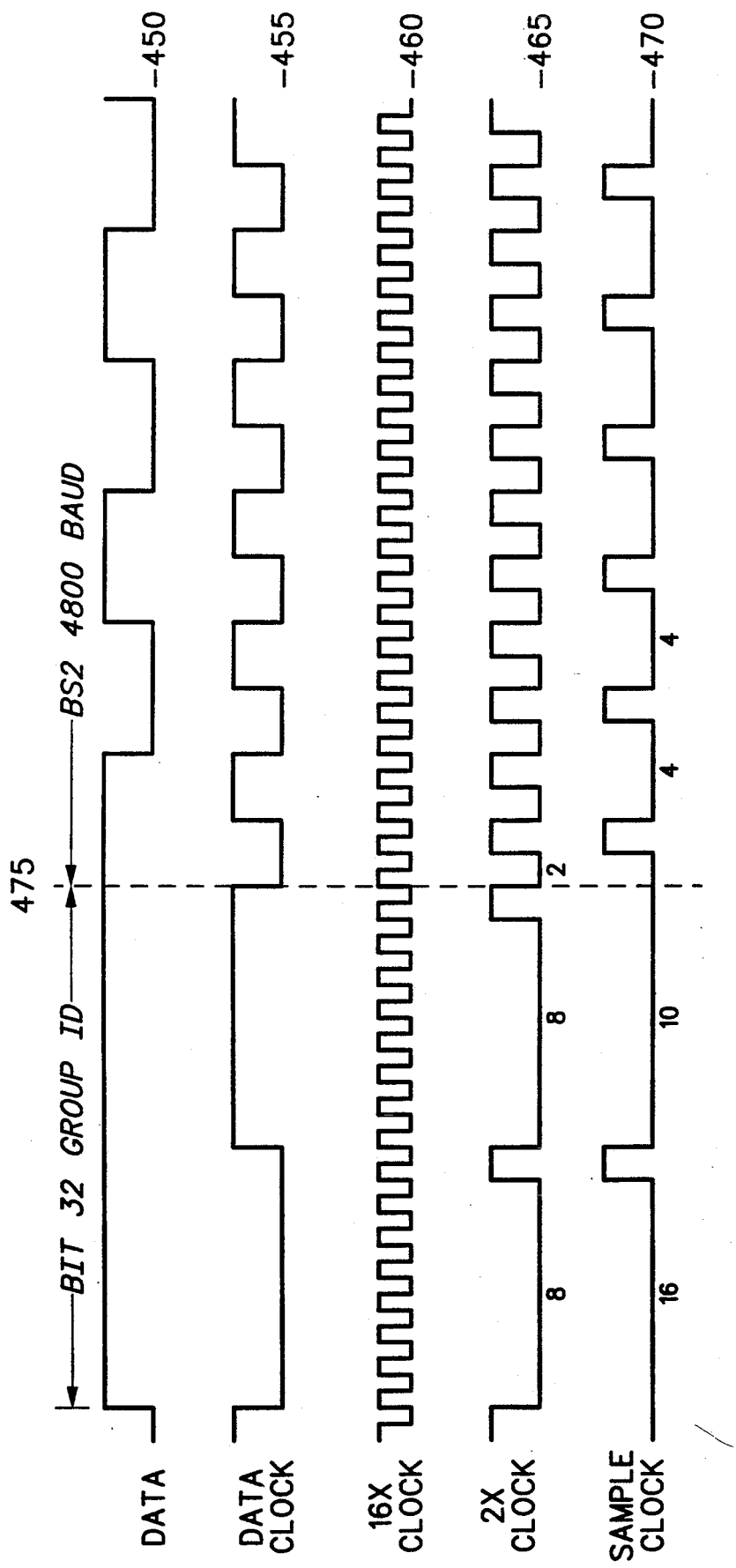
FIGS. 8A and 8B are timing diagrams of the synchronization operation of the selective call receiver according to the preferred embodiment of the present invention.
Figure 8B:
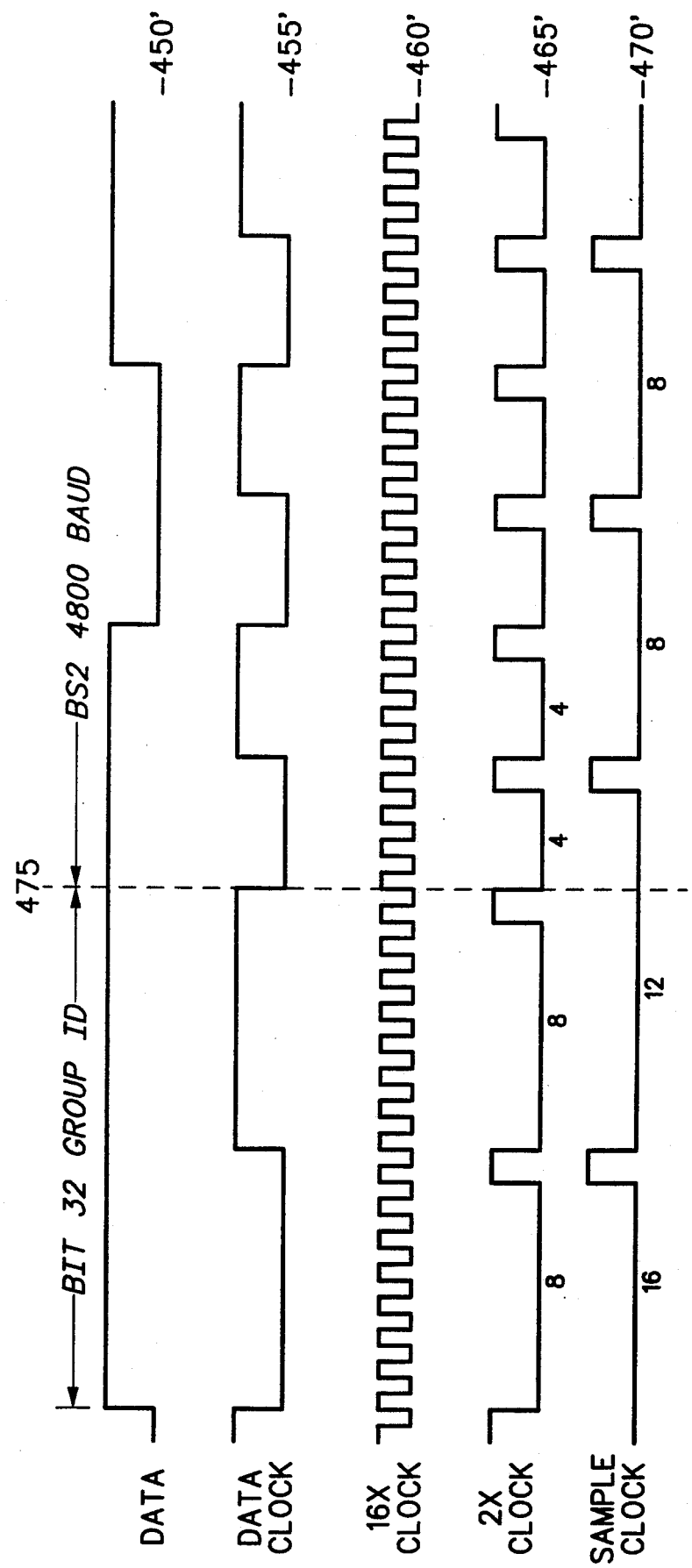

Referring next to FIGS. 8A and 8B, various signals are depicted during the transition from the frame information portion 45 to the second bit synchronization portion 50 of sync block 25 (FIG. 1B). Referring to FIG. 8A, signals depicting the demodulated data 450 received as input to the microprocessor 210 and the edge detector 230 (FIG. 6) are shown. Similarly timing signals are shown on lines 455, 460, 465, and 470, depicting the signals at the outputs of the divider 240, the timer 234, the two times clock timer 238, and the sample clock timer 244 (FIG. 6), respectively. The "A" word of the demodulated data signal indicates an information block transmission speed of 4800 baud. The transition from frame information portion 45 to second bit synchronization portion 50 is indicated at time 475.

Referring to FIG. 8B, similar signals are shown representing data received with an information block transmission speed of 2400 baud. As can be seen at the left hand side of FIGS. 8A and 8B, the upper nibble of timer latch 242 is loaded with eight causing the signal from the two times clock 238 shown on line 465 to be pulsed once for every eight pulses of the sixteen times clock signal 460. Similarly, the lower nibble of timer latch 242 is loaded with sixteen such that the sample clock timer 244 pulses the sample clock signal shown on line 470 at the rate of sixteen pulses of the sixteen times clock signal 460 to one pulse of the sample clock 470. The timer latch 242 (FIG. 6) is loaded at step 306 (FIG. 7A) with the upper and lower nibble values of eight and sixteen, respectively, irregardless of the transmission baud rate of the sync2 portion which begins at time 475.

When the "A" words have been read defining the baud rate of the sync2 portion, steps 354 and 358 (FIG. 7C), the timer latch is loaded with new values which adjust the sample clock pulse rate during the transition from the frame information 45 into the sync 2 portion 50 of the sync block signal. At 2400 baud (FIG. 8B), the sample clock waits twelve pulses of the sixteen times clock signal 460 before pulsing the first time in the sync2 block 470'. These values are loaded at step 354 (FIG. 7C). At step 390 of the 2400 baud sync2 search subroutine (FIG. 7E) the timer latch 242 (FIG. 6) is reloaded with a four in the upper nibble and an eight in the lower nibble. As seen on lines 465' and 470', the two times clock and the sample clock pulse together for the first pulse in the sync2 synchronization signal after time 475. Thereafter, the two times clock pulses twice for every pulse of the sample clock. In a like manner, on lines 465 and 470 when the sync2 block is transmitted at 4800 baud, the upper and lower nibbles of timer latch 242 (FIG. 6) are loaded at step 420 (FIG. 7F) with two and four, respectively. Similar to the 2400 baud signal, the two times clock on line 465 pulses twice for every pulse of the sample clock shown on line 470 and in synchronization therewith. It can also be seen that each pulse of the sample clock on line 470 samples the center of each bit of the demodulated data on line 450, which in the first bit of the sync2 portion of the sync block 25 (FIG. 1B) comprises alternating ones and zeros.

Figure 9A:
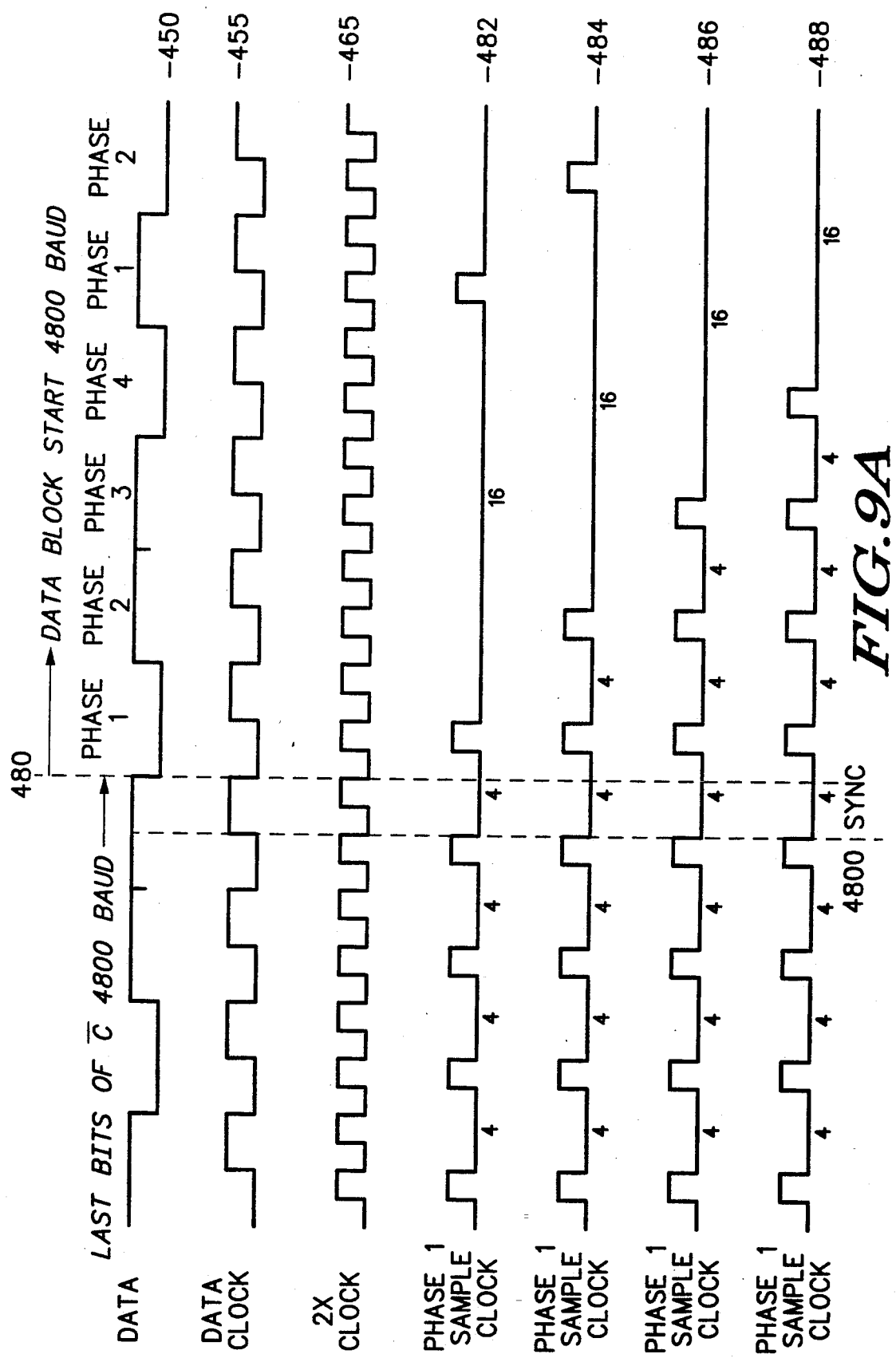
FIGS. 9A, 9B and 9C are timing diagrams of the demultiplexing operation of the selective call receiver according to the preferred embodiment of the present invention.
Figure 9B:
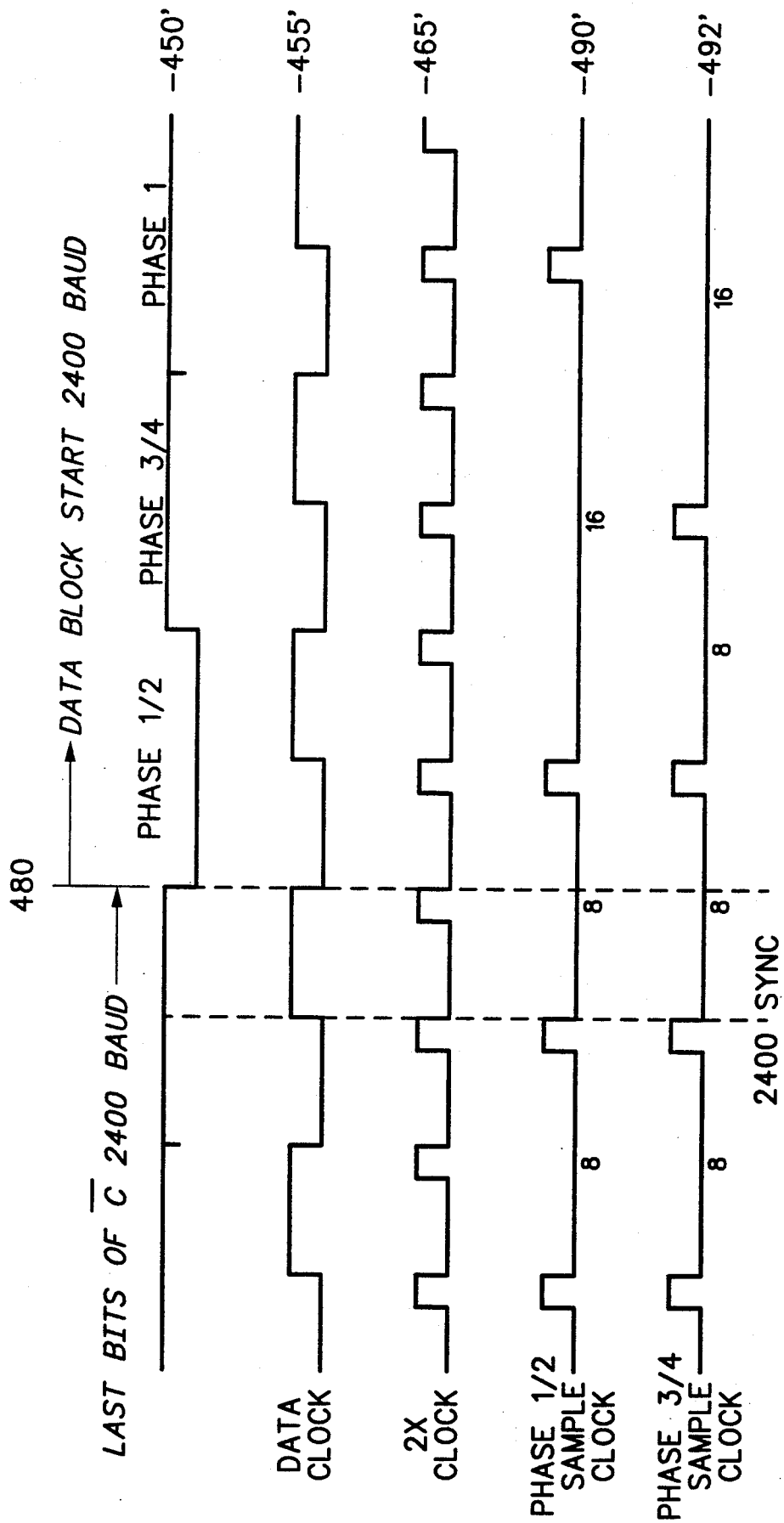
Figure 9C:
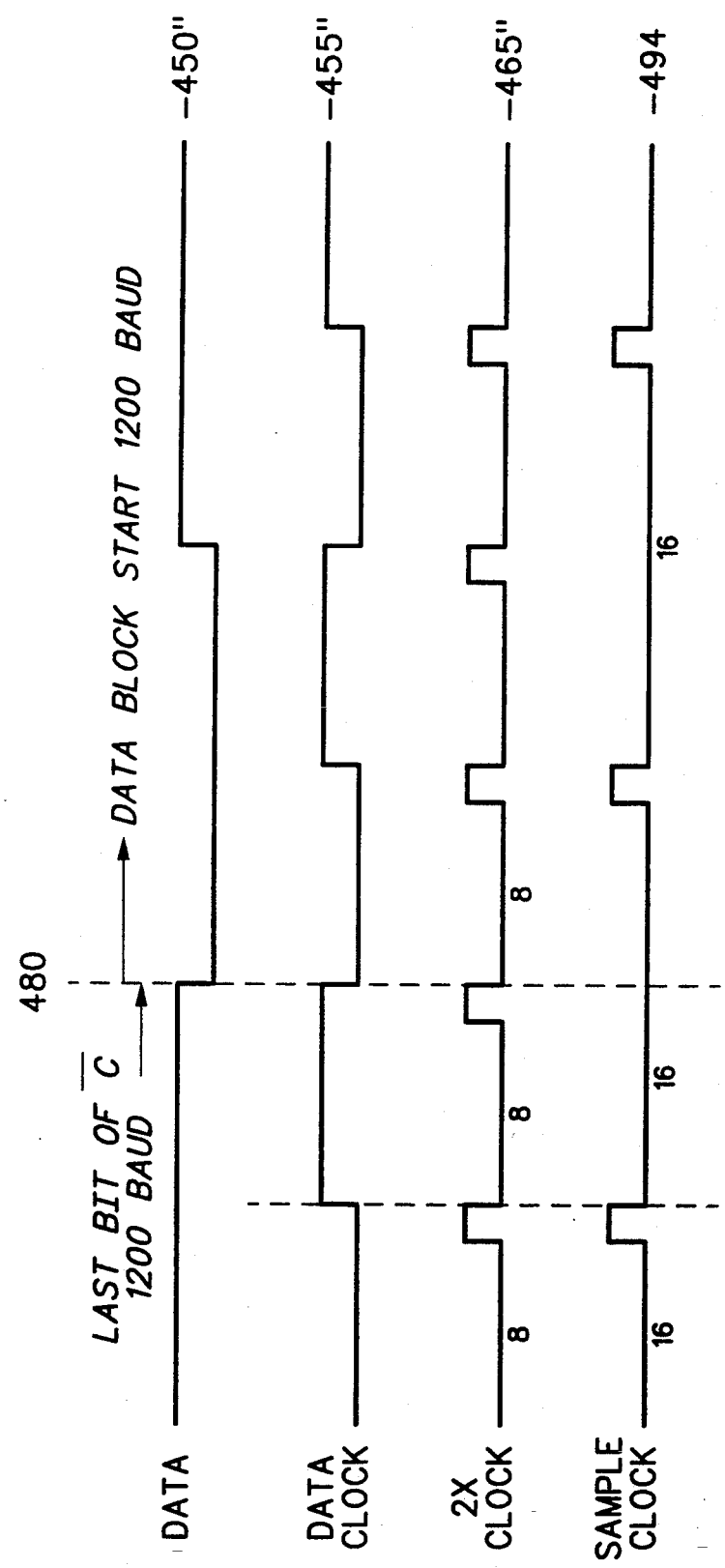

Referring next to FIGS. 9A, 9B, and 9C, the demodulated data signal on line 450, the data clock on line 455, the two times clock on line 465, and sample clock signals are depicted for information block information baud rates of 4800 baud, 2400 baud, and 1200 baud, respectively at the time of transition from the sync block 25 to the first information block 30 (FIG. 1A) 480. Referring first to FIG. 9A, in the 4800 baud sync2 search subroutine at step 438 (FIG. 7F) the timer latch upper nibble maintains a value of two while the lower nibble is loaded with a value of sixteen. The value of sixteen provided to the sample clock timer 244 (FIG. 6) allows the sample clock timer to provide a sample clock signal to the microprocessor 210 to sample once for every four bits of data received at 4800 baud and in the middle of each fourth bit, corresponding to one phase of the date received at 4800 baud. The sixteen value is not loaded into the lower nibble of the timer latch 242 until a number of samples have been taken as determined by the predetermined information provided to the microprocessor 210 from the code plug 208 which determines the phase on which the selective call receiver operates. The microprocessor converts the predetermined information to provide the various signals on the register data bus 211. Thus, for a phase one selective call receiver, the sample clock will operate as shown on line 482 a phase two selective call receiver will have a sample clock pulsing as shown on line 484, a phase three selective call receiver will operate as shown on line 486, and a phase four selective call receiver will have the sample clock signal for controlling the operation of the microprocessor 210 as shown on line 488. In this manner, a microprocessor decodes one data bit of every four data bits transmitted at 4800 baud, allowing the microprocessor to decode at 1200 baud.

In like manner, at 2400 baud a sixteen value is selectively loaded depending upon the phase of the selective call receiver. For phase one and two selective call receivers, the sample clock signal will operate as shown at line 490 and for phase three and phase four selective call receivers the sample clock receiver will operate as shown on line 492. This will allow the microprocessor 210 to decode at 1200 baud though the data is received at 2400 baud.

At information block transmission speeds of 1200 baud, the sample clock signal for all four phases will operate as shown on line 494 (FIG. 9C). New values will not be loaded into the eight bit timer latch 242 (FIG. 6) as an information block transmission speed 1200 baud is equivalent to the sync block transmission speed of 1200 baud.

The sample pulse scheme for the four phases is assigned so that if the selective call receiver makes an error in correctly decoding the "A" word designating the baud rate, the receiver will assume the highest speed. In the preferred embodiment, the selective call receiver will assume a 4800 information block baud rate. In so doing, the selective call receiver would still decode properly with the sample clock signals occurring within the proper bit, though not necessarily in the middle of the bit.

We claim:

1. In a selective call system, a method for generating and transmitting a signal comprising a plurality of phases at a baud rate comprising the steps of:

receiving a plurality of selective call messages, each of said plurality of selective call messages having one of a plurality of selective call addresses corresponding thereto;

time division multiplexing said plurality of selective call messages into said plurality of phases to form said signal, which of said plurality of phases for placing one of said plurality of selective call messages determined in response to said baud rate and one of said plurality of selective call addresses corresponding to said one of said plurality of selective call messages, wherein said step of time division multiplexing comprises the steps of:

storing each of said plurality of selective call messages as a plurality of message bits in one of a predetermined number of phase queues, the one of said predetermined number of phase queues determined by said selective call addresses and the predetermined number determined by said baud rate; and generating said signal comprising a bit stream, by serially inserting each of said plurality of message bits from each of said predetermined number of phase queues in a sequence starting with a first of said message bits stored in a first of said predetermined number of phase queues and thereafter sequentially inserting message bits in a wraparound manner such that after inserting a first of said message bits stored in a last of said predetermined number of phase queues, next inserting a second of said message bits stored in said first of said predetermined number of phase queues; and transmitting said signal.

2. The method according to claim 1 wherein the step of storing each of the plurality of selective call messages comprises the steps of:

interleaving the plurality of message bits of each of said plurality of selective call messages to form interleaved message bits; and storing said interleaved message bits in the one of said predetermined number of phase queues.

3. A selective call system for transmitting selective call messages to a plurality of selective call receivers at one of a plurality of predetermined baud rates, each of said selective call messages having an address, the selective call system comprising:

a selective call terminal comprising:
multiplexing means for generating a signal having a plurality of phases by time division multiplexing each of said selective call messages into at least one of said plurality of phases in response to said address of said each of said selective call messages and said one of said plurality of predetermined baud rates, wherein said multiplexing means comprises:
a number of phase queues, each of said number of phase queues for storing each of said plurality of phases;
queue determining means for determining in which of said number of phase queues to store one of said plurality of selective call messages in response to said address of said one of said plurality of messages; and
bit selection means for generating said signal by time division multiplexing said plurality of phases by selecting bits of said plurality of selective call messages serially from each of said number of phase queues in a sequence starting with a first of said bits stored in a first of said number of phase queues and thereafter sequentially selecting one of said bits in a wraparound manner such that after selecting a first of said bits stored in a last of said number of phase queues, next inserting a second of said bits stored in said first of said number of phase queues; and
transmitting means for transmitting said signal at said one of said plurality of predetermined baud rates; and a plurality of selective call receivers having selective call addresses, each of said plurality of selective call receivers comprising:
receiving means for receiving and demodulating said signal;
storage means for storing predetermined information; and
decoding means for decoding at least one of said plurality of phases of said signal, said at least one of said plurality of phases determined by said predetermined information.

4. The selective call system of claim 3 wherein said signal further comprises a baud rate signal indicative of said one of said plurality of baud rates; and wherein said decoding means of said plurality of selective call receivers decodes said one of said plurality of phases in response to said predetermined information and said baud rate signal.

5. The selective call system of claim 4 wherein each of said plurality of selective call receivers further comprises synchronizing means for synchronizing said decoding means to said at least one of said plurality of phases of said signal in response to a synchronizing portion of said signal, said synchronizing portion comprising said baud rate signal.

6. The selective call system of claim 3 wherein said number of phase queues is determined by said one of said plurality of baud rates.

7. The selective call system of claim 3 wherein said queue determining means is a lookup table comprising phase queue identification means for each of said selective call addresses.

8. The selective call system of claim 3 wherein said decoding means decodes said at least one of said plurality of phases of said signal at a predetermined one of said plurality of predetermined baud rates, said one of said plurality of predetermined baud rates being an integer multiple of said predetermined one of said plurality of predetermined baud rates.

9. A selective call receiver comprising:
receiving means for receiving and demodulating a first signal received at a first data baud rate to recover first bit stream information having said first data baud rate, said first bit stream information comprising a first plurality of bits;
decoding means for decoding said first bit stream information at a second data baud rate to derive a selective call message, wherein said second data baud rate is different from said first data baud rate;
control means coupled to said receiving means and said decoding means for providing only a first bit of every N bits of said first plurality of bits recovered by said receiving means to said decoding means such that said decoding means decodes said first bit of every N bits of said first plurality of bits, wherein N is an integer and is equivalent to said first data baud rate divided by said second data baud rate.

10. The selective call receiver according to claim 9 wherein said second data baud rate is substantially constant and said first data baud rate has a value which is variable.

11. The selective call receiver according to claim 10 wherein said decoding means comprises a decoder using a decoding algorithm for processing said first bit stream information, said decoding algorithm remaining substantially constant regardless of the value of said first data baud rate.

12. The selective call receiver according to claim 9 wherein said receiving means further receives and demodulates a second signal at said second data baud rate to recover second bit stream information comprising a second plurality of bits, and wherein said decoding means decodes every bit of said second plurality of bits at said second data baud rate to derive data information.

13. A selective call receiver comprising:
receiving means for receiving and demodulating a signal having a first portion received at a first data baud rate to recover first bit stream information having said first data baud rate and for receiving and demodulating a second portion received at a second data baud rate different from said first data baud rate to recover second bit stream information having said second data baud rate;

decoding means for decoding said first and second bit stream information at said first data baud rate; and control means coupled to said receiving means and said decoding means for providing every bit of said first bit stream information recovered by said receiving means to said decoding means such that said decoding means decodes said every bit at said first data baud rate, and for providing only a first bit of every N bits of said second bit stream information recovered by said receiving means to said decoding means such that said decoding means decodes said first bit of every N bits of said second bit stream information at said first data baud rate, where N is integer and is equivalent to said second data baud rate divided by said first data baud rate.

14. The selective call receiver according to claim 13 wherein said second data baud rate has a value which is variable and wherein said decoding means comprises a decoder using a decoding algorithm which remains fixed regardless of the value of said second data baud rate.

15. In a selective call system, a method for generating a signal for transmission at a baud rate comprising the steps of:

receiving a plurality of selective call messages, each of said plurality of selective call messages having one of a plurality of selective call addresses corresponding thereto;

determining a message traffic density in response to the number of said plurality of selective call messages received within a predetermined time duration;

time division multiplexing said plurality of selective call messages into a number of phases to form said signal for transmission at said baud rate, said number of phases and said baud rate determined by said message traffic density and which of said number of phases for placing one of said plurality of selective call messages determined by said baud rate and one of said plurality of selective call addresses corresponding to said one of said plurality of selective call messages, wherein said step of time division multiplexing comprises the steps of:

storing each of said plurality of selective call messages as a plurality of message bits in one of a number of phase queues, the number of phase queues corresponding to said number of phases and said one of said number of phase queues determined by said one of said plurality of selective call addresses corresponding to the one of said plurality of selective call messages; and generating said signal comprising a bit stream, by serially inserting each of said plurality of message bits from each of said number of phase queues in a sequence starting with a first of said message bits stored in a first of said number of phase queues and thereafter sequentially inserting message bits in a wraparound manner such that after inserting a first of said message bits stored in a last of said number of phase queues, next inserting a second of said message bits stored in said first of said number of phase queues; and transmitting said signal.

16. The method according to claim 15 wherein the step of storing each of the plurality of selective call messages comprises the steps of:

interleaving the message bits of each of said plurality of selective call messages to form interleaved message bits; and storing said interleaved message bits in said one of said number of phase queues.

17. A method in a communication system for transmitting a plurality of selective call messages at a first baud rate from a terminal to at least one receiver having at least one address assigned thereto, the method comprising the steps of:

at said terminal receiving a plurality of messages, each of said messages having one of a plurality of selective call addresses corresponding thereto;

combining each of said messages with said one of said plurality of selective call addresses corresponding thereto to form one of said plurality of selective call messages, each of said plurality of selective call messages having a plurality of message bits;

time division multiplexing said plurality of selective call messages into a number of phases to form said number of phases each comprising bits by assigning the plurality of message bits of each of said plurality of selective call messages to one of said number of phases, said number of phases determined by said first baud rate and said one of said plurality of phases for assigning each of said plurality of selective call messages determined by said first baud rate and said one of said plurality of selective call addresses corresponding to said one of said plurality of selective call messages;

encoding said plurality of selective call messages into a signal by serially inserting one of said bits from each of said number of phases in a manner starting with a first of said bits stored in a first of said number of phases and thereafter sequentially inserting ones of said bits in a wraparound manner such that after inserting a first of said bits stored in a last of said number of phases, next inserting a second of said bits stored in said first of said number of phases; and transmitting said signal at said first baud rate;

at each of said at least one receiver receiving and demodulating said signal;

decoding a first portion of each of said plurality of selective call messages of said signal in one of said number of phases at a second baud rate to determine whether said one of said plurality of selective call addresses corresponding thereto is the address assigned to said one of said at least one receiver, said first baud rate being an integer multiple of said second baud rate and said one of said number of phases determined by said first baud rate and the address assigned to said one of said at least one receiver; and decoding a remaining portion of one of said plurality of selective call messages in said one of said number of phases at said second baud rate if said step of decoding a first portion determines that said one of said plurality of selective call addresses corresponding to said one of said plurality of selective call messages is the address assigned to said one of said at least one receiver.

18. A selective call system for transmitting selective call messages to a plurality of selective call receivers at one of a plurality of predetermined baud rates, each of said selective call messages having an address, the selective call system comprising:
- a selective call terminal comprising:
  - input means for receiving message information;
  - interleaving means for interleaving said message information to form said selective call messages;
  - multiplexing means for generating a signal having a plurality of phases by time division multiplexing each of said selective call messages into at least one of said plurality of phases in response to said address of said each of said selective call messages and said one of said plurality of predetermined baud rates; and
  - transmitting means for transmitting said signal at said one of said plurality of predetermined baud rates; and
- a plurality of selective call receivers having selective call addresses, each of said plurality of selective call receivers comprising:
  - receiving means for receiving and demodulating said signal;
  - storage means for storing predetermined information; and
  - decoding means for decoding at least one of said plurality of phases of said signal, said at least one one of said plurality of phases determined by said predetermined information, said decoding means comprising:
    - phase extracting means for extracting said at least one of said plurality of phases from said signal;
    - deinterleaving means for deinterleaving said at least one of said plurality of phases; and
    - processing means for decoding said selective call messages to derive said message information.

19. A selective call receiver for receiving a signal having a plurality of baud rates, each of said plurality of baud rates being an integer multiple of a predetermined one of said plurality of baud rates, the signal comprising synchronization information having a first portion and a second portion, the selective call receiver comprising:
- receiving means for receiving and demodulating the signal;
- synchronizing means for processing the first portion of the synchronization information of the demodulated signal at the predetermined one of said plurality of baud rates to acquire coarse bit and frame synchronization to the signal and for processing the second portion of the synchronization information at one of said plurality of baud rates other than the predetermined one of said plurality of baud rates to acquire fine bit and frame synchronization to the signal; and
- decoding means for decoding the signal in accordance with said one of said plurality of baud rates other than the predetermined one of said plurality of baud rates.

20. The selective call receiver of claim 19 wherein the synchronizing means processes the second portion at said one of said plurality of baud rates other than the predetermined one of said plurality of baud rates in response to the first portion.

21. The selective call receiver of claim 20 wherein the first portion includes baud rate information, and wherein the synchronizing means processes the second portion at said one of said plurality of baud rates other than the predetermined one of said plurality of baud rates in response to the baud rate information.

22. The selective call receiver of claim 20 wherein the first portion includes baud rate information, and wherein the decoding means decodes the signal in response to the baud rate information.

* * * * *